(12) United States Patent
Sugano

(10) Patent No.: US 12,160,556 B2
(45) Date of Patent: Dec. 3, 2024

(54) INFORMATION PROCESSING DEVICE, INFORMATION PROCESSING METHOD, PROGRAM, AND INFORMATION PROCESSING SYSTEM

(71) Applicant: SONY GROUP CORPORATION, Tokyo (JP)

(72) Inventor: Hisako Sugano, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 78 days.

(21) Appl. No.: 17/770,525

(22) PCT Filed: Nov. 25, 2020

(86) PCT No.: PCT/JP2020/043735
§ 371 (c)(1),
(2) Date: Apr. 20, 2022

(87) PCT Pub. No.: WO2021/117482
PCT Pub. Date: Jun. 17, 2021

(65) Prior Publication Data
US 2022/0394231 A1 Dec. 8, 2022

(30) Foreign Application Priority Data

Dec. 9, 2019 (JP) ................................ 2019-222245

(51) Int. Cl.
*H04N 13/194* (2018.01)
*H04N 13/00* (2018.01)
(Continued)

(52) U.S. Cl.
CPC ......... *H04N 13/194* (2018.05); *H04N 13/111* (2018.05); *H04N 13/161* (2018.05); *H04N 2013/0096* (2013.01)

(58) Field of Classification Search
None
See application file for complete search history.

(56) References Cited

U.S. PATENT DOCUMENTS 9,478,061 B2 * 10/2016 Shimizu ................. G06V 20/56
11,037,364 B2 * 6/2021 Yushiya ............... H04N 23/698
(Continued)

FOREIGN PATENT DOCUMENTS

| CN | 109429052 A | 3/2019 |
| CN | 109561296 A | 4/2019 |

(Continued)

*Primary Examiner* — Stefan Gadomski
(74) *Attorney, Agent, or Firm* — Paratus Law Group, PLLC

(57) ABSTRACT

There is provided an information processing device, an information processing method, a program, and an information processing system capable of providing a user who views a free viewpoint moving image with better user experience. The information processing device of the present technology includes: a transmission unit that transmits a moving image; and a control unit that controls the transmission unit to transmit a free viewpoint moving image or a real camera viewpoint moving image on the basis of a result of determination on whether or not the free viewpoint moving image has been successfully generated, the free viewpoint moving image being a moving image generated by using a plurality of camera moving images generated by imaging a subject by using a plurality of cameras and viewed from an arbitrary position and direction, the real camera viewpoint moving image being a moving image generated from a camera moving image generated by imaging the subject by using a camera and viewed from a position and direction of the camera. The present technology is applicable to a real-time volumetric system that transmits a free viewpoint moving image in real time.

20 Claims, 25 Drawing Sheets

(51) Int. Cl.
*H04N 13/111* (2018.01)
*H04N 13/161* (2018.01)

(56) References Cited

U.S. PATENT DOCUMENTS

| | | | | |
|---|---|---|---|---|
| 2016/0332574 A1* | 11/2016 | Park | ................. | H04N 7/181 |
| 2017/0094259 A1* | 3/2017 | Kouperman | ......... | H04N 13/111 |
| 2018/0191941 A1* | 7/2018 | Arai | ................. | H04N 23/661 |
| 2018/0232943 A1* | 8/2018 | Shikata | ............. | H04N 13/111 |
| 2018/0330163 A1 | 11/2018 | Matsuzaki | | |
| 2018/0332218 A1* | 11/2018 | Yoshimura | ............ | H04N 23/90 |
| 2018/0359458 A1* | 12/2018 | Iwakiri | ................. | G06T 15/205 |
| 2019/0068945 A1* | 2/2019 | Maruyama | ........... | A63F 13/5255 |
| 2019/0174112 A1* | 6/2019 | Adachi | ............. | H04N 13/111 |
| 2019/0182470 A1* | 6/2019 | Mizuno | ................. | G06T 15/205 |
| 2019/0221029 A1* | 7/2019 | Yoneda | ................. | G06T 7/70 |
| 2019/0246089 A1* | 8/2019 | Maeda | ................. | G06T 15/205 |
| 2019/0253639 A1* | 8/2019 | Takama | ................. | G06T 15/20 |
| 2019/0281274 A1* | 9/2019 | Sugio | ................. | H04N 13/161 |
| 2019/0297393 A1* | 9/2019 | Okutani | ............. | H04N 21/8456 |
| 2019/0387219 A1* | 12/2019 | Kondo | ................. | H04N 7/183 |
| 2020/0021761 A1* | 1/2020 | Tanaka | ................. | H04N 13/117 |
| 2020/0068188 A1* | 2/2020 | Maeda | ................. | G06T 15/20 |
| 2020/0082603 A1* | 3/2020 | Arai | ................. | H04N 23/62 |
| 2020/0329189 A1* | 10/2020 | Tanaka | ................. | G06T 17/20 |

FOREIGN PATENT DOCUMENTS

| | | | |
|---|---|---|---|
| JP | 2004246667 A | | 9/2004 |
| JP | 2012-119916 A | | 6/2012 |
| JP | 2018063500 A | | 4/2018 |
| JP | 2018-133063 A | | 8/2018 |
| JP | 2018207252 A | | 12/2018 |
| JP | 2019125929 A * | 7/2019 | ............ G06T 15/20 |
| WO | WO 2018/043225 A1 | | 3/2018 |
| WO | WO 2018/150933 A1 | | 8/2018 |

* cited by examiner

FIG. 7

| EVENT | CONDITION/DETERMINATION | MEASURE |
|---|---|---|
| ABNORMALITY (FOR EXAMPLE, OUT-OF-SYNCHRONIZATION OR FRAME DROP) HAS OCCURRED IN CAMERAS AT TIME OF IMAGING | HOW MANY CAMERAS ARE ABNORMAL? CAN DISTRIBUTION OF CAMERAS THAT NORMALLY PERFORM IMAGING ENSURE QUALITY OF SHAPE? | IN A CASE WHERE THE NUMBER OF DROPPED CAMERAS IS SMALL AND QUALITY OF SHAPE CAN BE ENSURED, PERFORM THREE-DIMENSIONAL RECONSTRUCTION BY USING ONLY CAMERAS WHOSE MOVING IMAGES CAN BE CONFIRMED AS BEING NORMAL |
| DELAY OCCURS IN TRANSMISSION OF MOVING IMAGES NOT ALL STREAMS ARE PREPARED WITHIN SPECIFIED TIME | HOW MANY PIECES OF ENCODED DATA IS DELAYED? CAN DISTRIBUTION OF CAMERAS THAT NORMALLY PERFORM IMAGING ENSURE QUALITY OF SHAPE? | IN A CASE WHERE THE NUMBER OF DROPPED CAMERAS IS SMALL AND QUALITY OF SHAPE CAN BE ENSURED, PERFORM THREE-DIMENSIONAL RECONSTRUCTION BY USING ONLY CAMERAS WHOSE MOVING IMAGES CAN BE CONFIRMED AS BEING NORMAL |
| DECODING CANNOT BE PERFORMED AFTER MOVING IMAGES ARE UPLOADED OR STREAMS ARE CORRUPTED | HOW MANY CAMERA MOVING IMAGES CANNOT BE RESTORED? CAN DISTRIBUTION OF CAMERAS THAT NORMALLY PERFORM IMAGING ENSURE QUALITY OF SHAPE? | IN A CASE WHERE THE NUMBER OF DROPPED CAMERAS IS SMALL AND QUALITY OF SHAPE CAN BE ENSURED, PERFORM THREE-DIMENSIONAL RECONSTRUCTION BY USING ONLY CAMERAS WHOSE MOVING IMAGES CAN BE CONFIRMED AS BEING NORMAL |
| PROCESSING TIME DOES NOT MEET REAL TIME AT TIME OF GENERATING 3D MODEL | — | SWITCH MOVING IMAGE TO CG COMBINED REAL CAMERA VIEWPOINT MOVING IMAGE |
| INTERACTION FOR CHANGING VIEWPOINT IS NOT RECEIVED FROM USER | IS AUTOPILOT SET? | REPRODUCE MOVING IMAGE FROM VIEWPOINT POSITION PREPARED BY TRANSMISSION SIDE OR SWITCH MOVING IMAGE TO CG COMBINED REAL CAMERA VIEWPOINT MOVING IMAGE |
| MALFUNCTIONS OCCUR TOO FREQUENTLY | HAS CERTAIN PERIOD OF TIME PASSED? | SWITCH MOVING IMAGE TO CG COMBINED REAL CAMERA VIEWPOINT MOVING IMAGE |

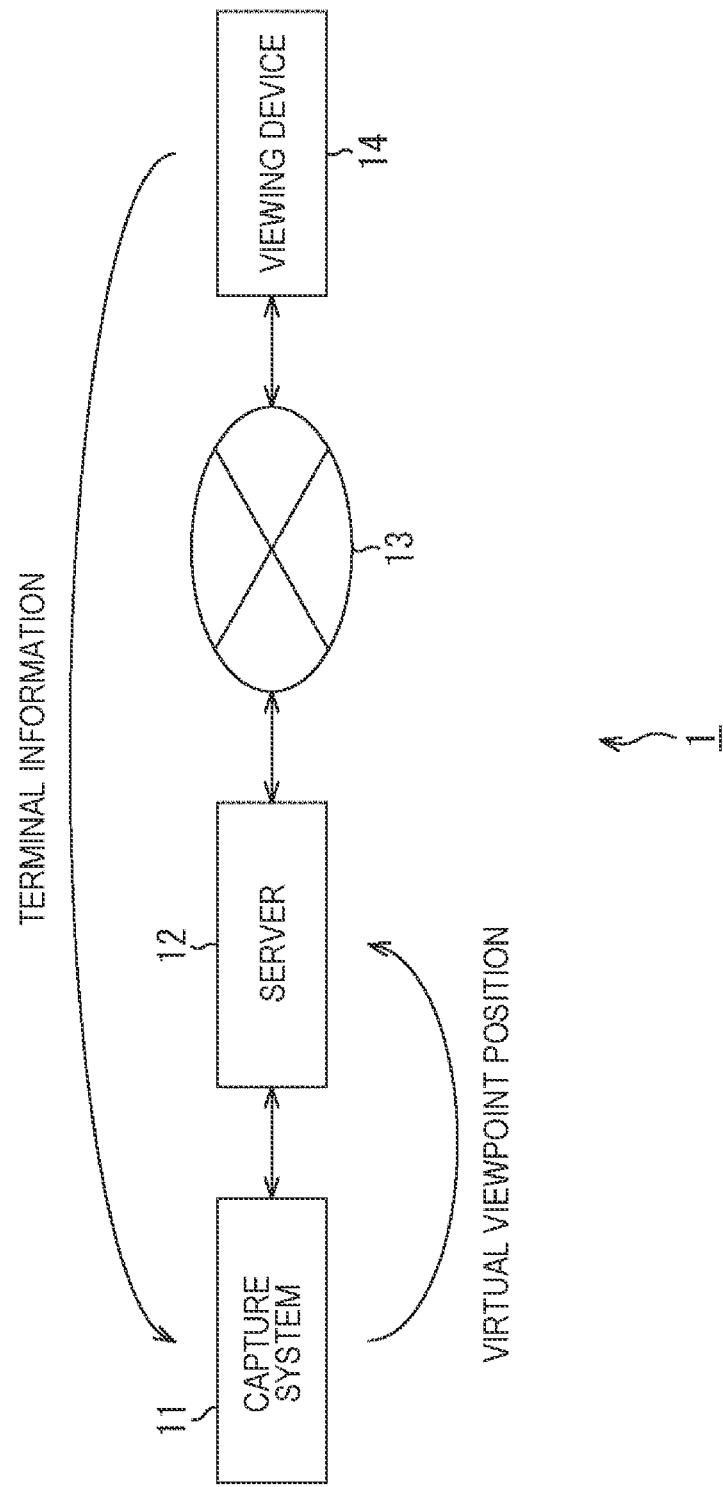

INFORMATION PROCESSING DEVICE, INFORMATION PROCESSING METHOD, PROGRAM, AND INFORMATION PROCESSING SYSTEM

CROSS REFERENCE TO PRIOR APPLICATION

This application is a National Stage Patent Application of PCT International Patent Application No. PCT/JP2020/043735 (filed on Nov. 25, 2020) under 35 U.S.C. § 371, which claims priority to Japanese Patent Application No. 2019-222245 (filed on Dec. 9, 2019), which are all hereby incorporated by reference in their entirety.

TECHNICAL FIELD

The present technology relates to an information processing device, an information processing method, a program, and an information processing system, and more particularly relates to an information processing device, an information processing method, a program, and an information processing system capable of providing a user who views a free viewpoint moving image with better user experience.

BACKGROUND ART

There is a technology of generating a 3D model of a subject from moving images captured from multiple viewpoints and generating a free viewpoint moving image that is a moving image according to an arbitrary viewpoint position on the basis of the 3D model. Such a technology is also called a volumetric capture technology, for example.

For example, Patent Document 1 discloses a technology of generating a 3D model by using a method such as visual hull in which a three-dimensional shape of a subject is formed on the basis of a plurality of captured images captured from different directions.

CITATION LIST

Patent Document

Patent Document 1: WO 2018/150933 A

SUMMARY OF THE INVENTION

Problems to be Solved by the Invention

There is a case where a free viewpoint moving image generated by the volumetric capture technology is transmitted in real time to allow a user appearing as a subject in the free viewpoint moving image to communicate with a user viewing the free viewpoint moving image.

However, in a case where not all camera moving images captured from multiple viewpoints are normally transmitted, a free viewpoint moving image of a deformed 3D model may be displayed or a free viewpoint moving image may not be displayed on the viewing side. This degrades user experience of viewing the free viewpoint moving image.

The present technology has been made in view of such a circumstance, and an object thereof is to provide a user who views a free viewpoint moving image with better user experience.

Solutions to Problems

An information processing device according to one aspect of the present technology is an information processing device including: a transmission unit that transmits a moving image; and a control unit that controls the transmission unit to transmit a free viewpoint moving image or a real camera viewpoint moving image on the basis of a result of determination on whether or not the free viewpoint moving image has been successfully generated, the free viewpoint moving image being a moving image generated by using a plurality of camera moving images generated by imaging a subject by using a plurality of cameras and viewed from an arbitrary position and direction, the real camera viewpoint moving image being a moving image generated from a camera moving image generated by imaging the subject by using a camera and viewed from a position and direction of the camera.

An information processing method according to one aspect of the present technology is an information processing method, in which: an information processing device controls a transmission unit to transmit a free viewpoint moving image or a real camera viewpoint moving image on the basis of a result of determination on whether or not the free viewpoint moving image has been successfully generated, the free viewpoint moving image being a moving image generated by using a plurality of camera moving images generated by imaging a subject by using a plurality of cameras and viewed from an arbitrary position and direction, the real camera viewpoint moving image being a moving image generated from a camera moving image generated by imaging the subject by using a camera and viewed from a position and direction of the camera, and transmits the free viewpoint moving image or the real camera viewpoint moving image in accordance with the control.

A program according to one aspect of the present technology is a program for causing a computer to execute the processing of controlling a transmission unit to transmit a free viewpoint moving image or a real camera viewpoint moving image on the basis of a result of determination on whether or not the free viewpoint moving image has been successfully generated, the free viewpoint moving image being a moving image generated by using a plurality of camera moving images generated by imaging a subject by using a plurality of cameras and viewed from an arbitrary position and direction, the real camera viewpoint moving image being a moving image generated from a camera moving image generated by imaging the subject by using a camera and viewed from a position and direction of the camera, and transmitting the free viewpoint moving image or the real camera viewpoint moving image in accordance with the control.

An information processing system according to one aspect of the present technology is an information processing system including an imaging device and an information processing device, in which: the imaging device includes a plurality of imaging units each of which images a subject and generates a camera moving image, an imaging determination unit that determines whether or not the camera moving images have been successfully generated by the plurality of imaging units, and an information transmission unit that transmits, to the information processing device, the plurality of camera moving images generated by the plurality of imaging units and a determination result obtained by the imaging determination unit; and the information processing device includes an information reception unit that receives the plurality of camera moving images and the determination result transmitted from the imaging device, a moving image transmission unit that transmits a moving image, and a control unit that controls the information transmission unit to transmit a free viewpoint moving image or a real camera viewpoint moving image on the basis of the determination result received by the information reception unit, the free viewpoint moving image being a moving image generated by using the plurality of camera moving images received by the information reception unit and viewed from an arbitrary position and direction, the real camera viewpoint moving image being a moving image generated by using the camera moving image received by the information reception unit and viewed from a position and direction of the imaging unit.

In the information processing device, the information processing method, and the program according to one aspect of the present technology, a moving image is transmitted, and the transmission unit is controlled to transmit a free viewpoint moving image or a real camera viewpoint moving image on the basis of a result of determination on whether or not the free viewpoint moving image has been successfully generated, the free viewpoint moving image being a moving image generated by using a plurality of camera moving images generated by imaging a subject by using the plurality of cameras and viewed from an arbitrary position and direction, the real camera viewpoint moving image being a moving image generated from a camera moving image generated by imaging the subject by using a camera and viewed from a position and direction of the camera.

In the information processing system according to one aspect of the present technology, a subject is imaged to generate camera moving images, whether or not the camera moving images have been successfully generated by the plurality of imaging units is determined, the plurality of camera moving images generated by the plurality of imaging units and a determination result obtained by the imaging determination unit are transmitted to the information processing device, the plurality of camera moving images and the determination result transmitted from the imaging device are received, a moving image is transmitted, and the information transmission unit is controlled to transmit a free viewpoint moving image or a real camera viewpoint moving image on the basis of the determination result received by the information reception unit, the free viewpoint moving image being a moving image generated by using the plurality of camera moving images received by the information reception unit and viewed from an arbitrary position and direction, the real camera viewpoint moving image being a moving image generated by using the camera moving image received by the information reception unit and viewed from a position and direction of the imaging unit.

BRIEF DESCRIPTION OF DRAWINGS

FIG. 7 shows examples of a switching condition between a free viewpoint moving image and a real camera viewpoint moving image.

FIG. 8 shows an example of a flow of information in an information processing system.

MODE FOR CARRYING OUT THE INVENTION

Hereinafter, modes for carrying out the present technology will be described. Description will be provided in the following order.

1. Description of overview of information processing system
2. First information processing example
3. Second information processing example
4. Third information processing example
5. Modification examples 1. Description of Overview of Information Processing System FIG. 1 shows a configuration example of an information processing system 1 according to an embodiment of the present technology.

Figure 1:
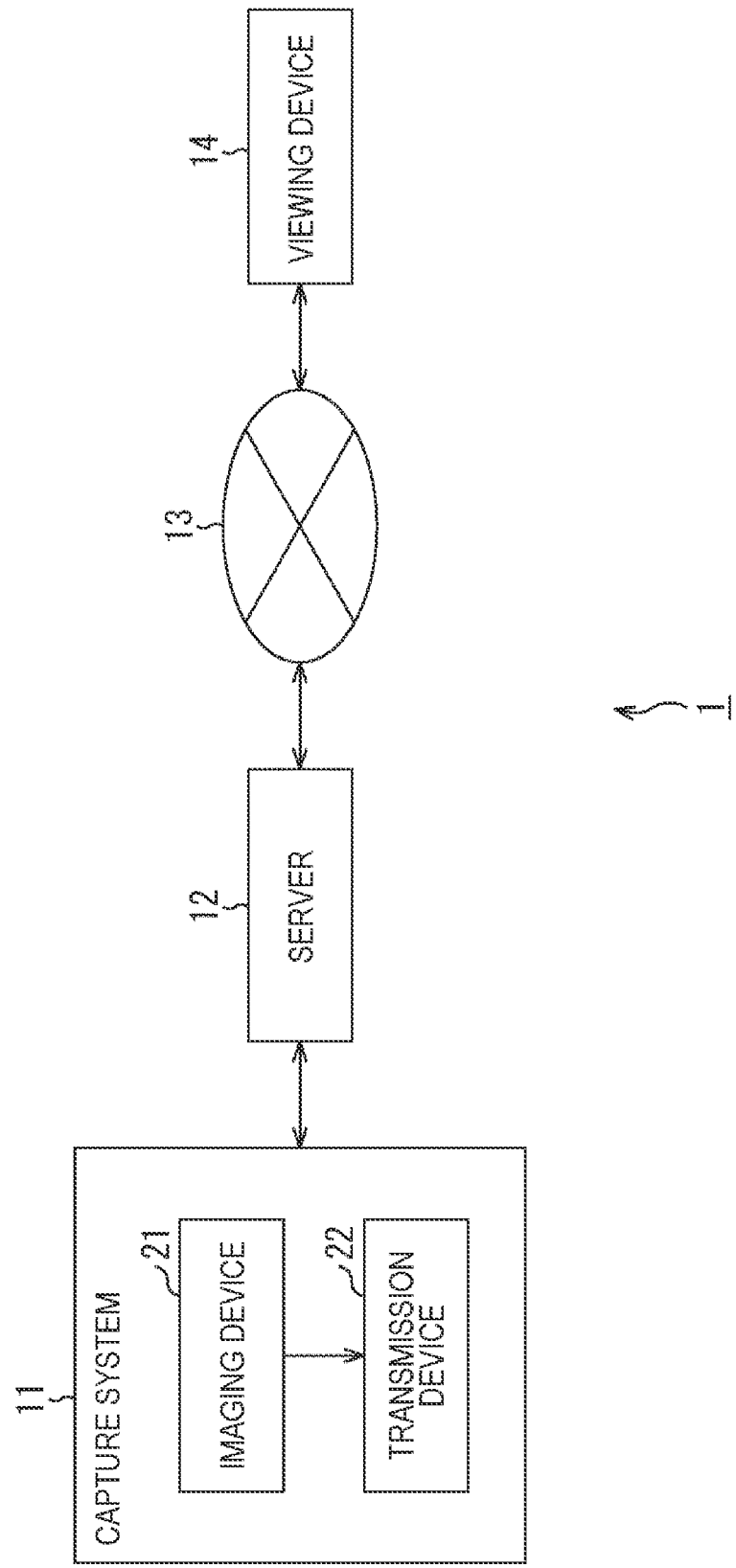
FIG. 1 shows a configuration example of an information processing system according to an embodiment of the present technology.

As shown in FIG. 1, the information processing system 1 includes a capture system 11, a server 12, and a viewing device 14. The capture system 11 and the server 12 are connected via wired or wireless communication. The server 12 and the viewing device 14 are connected via a network 13 such as the Internet, a wireless local area network (LAN), or a cellular network. Note that the capture system 11 may be connected to the server 12 or the viewing device 14 via the network 13.

The capture system 11 includes an imaging device 21 and a transmission device 22.

The imaging device 21 includes a plurality of cameras that images a subject and generates camera moving images. For example, cameras for computer vision, cameras other than the cameras for computer vision, smartphones, network cameras, depth sensors, and the like can be used as the cameras included in the imaging device 21. The plurality of cameras included in the imaging device 21 is arranged to surround the subject and images the subject from multiple viewpoints. Note that the number of cameras included in the imaging device 21 is arbitrary as long as there is a plurality of cameras.

The transmission device 22 includes, for example, a personal computer (PC) or a dedicated device. For example, the same number of PCs as the number of cameras included in the imaging device 21 are prepared as the transmission device 22. The transmission device 22 transmits the plurality of camera moving images generated by the imaging device 21 to the server 12. Multi-view camera moving images obtained by imaging the subject from a plurality of viewpoint positions are transmitted from the transmission device 22 to the server 12. Note that the number of PCs (or dedicated devices) included in the transmission device 22 is arbitrary. The number of PCs (or dedicated devices) may be the same as or different from the number of cameras.

The server 12 is, for example, a server device installed on a network. The server 12 may be realized by one server device or a plurality of server devices forming a so-called cloud. The server 12 generates a free viewpoint moving image by using the plurality of camera moving images transmitted from the capture system 11. The free viewpoint moving image is a moving image that can be viewed from an arbitrary position and direction.

Further, the server 12 generates a real camera viewpoint moving image by using any one of the plurality of camera moving images transmitted from the capture system 11. The real camera viewpoint moving image is a moving image generated by using a camera moving image captured by a specific camera among the plurality of cameras included in the imaging device 21. That is, the real camera viewpoint moving image is a moving image viewed from a position and direction of the specific camera. Meanwhile, the free viewpoint moving image can be viewed from a position and direction of any one of the cameras or can be viewed from a virtual viewpoint that is not a position or direction of any one of the cameras.

The server 12 transmits the free viewpoint moving image or the real camera viewpoint moving image to the viewing device 14 via the network 13.

The viewing device 14 includes, for example, a device having a display function, such as a PC, a smartphone, a tablet terminal, or a head-mounted display. The viewing device 14 receives the moving image transmitted from the server 12 and displays the moving image in real time.

For example, in a case where the free viewpoint moving image is transmitted from the server 12, the viewing device 14 displays a moving image of a 3D model of the subject. A user can view the 3D model of the subject from an arbitrary viewpoint in real time by operating the viewing device 14.

Note that FIG. 1 shows one capture system 11, one server 12, one network 13, and one viewing device 14, but the numbers of those systems and devices included in the information processing system 1 may be one or more.

Figure 2:
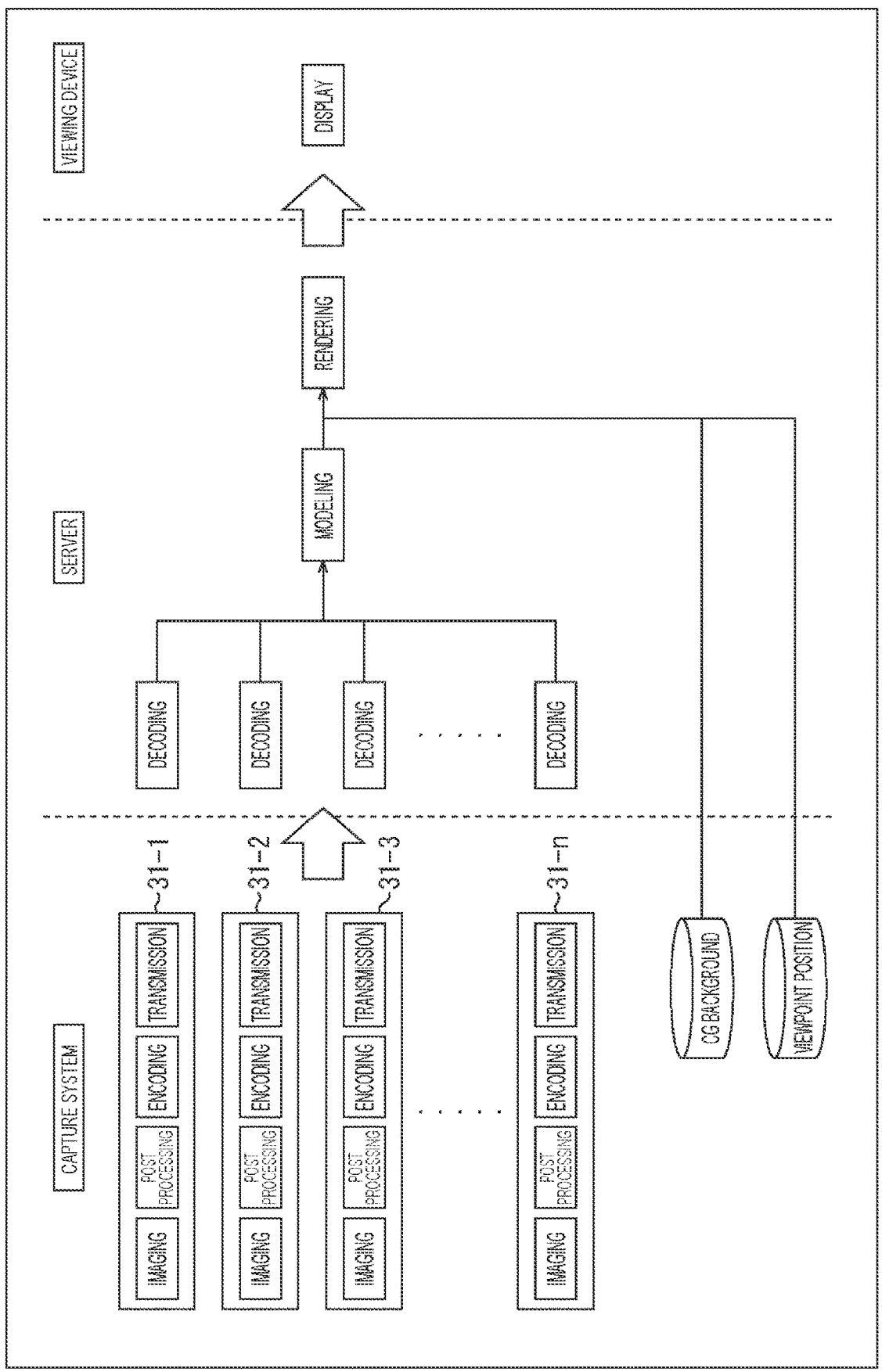
FIG. 2 shows a flow of processing of an information processing system that transmits a free viewpoint moving image.

FIG. 2 shows a flow of processing of the information processing system 1 that transmits the free viewpoint moving image.

As shown on a left side of FIG. 2, for example, in the capture system 11, the imaging device 21 and the transmission device 22 form camera systems 31-1 to 31-$n$ each of which performs processing of performing imaging and transmitting a camera moving image. Hereinafter, the camera systems 31-1 to 31-$n$ will be collectively referred to as camera systems 31 in a case where there is no need to distinguish those camera systems. Other configurations plurally provided will also be collectively described in a similar manner.

Each of the camera systems 31-1 to 31-$n$ is realized by at least one camera of the imaging device 21 and at least one PC of the transmission device 22. The numbers of them (cameras and PCs) included in one camera system 31 are arbitrary, and one or a plurality of cameras and PCs may be provided. Further, the numbers of cameras and PCs may be the same as or different from each other. Hereinafter, description will be provided on the assumption that one camera system 31 includes one camera and one PC. The cameras that perform imaging in the respective camera systems 31 are arranged to surround the subject.

Figure 3:
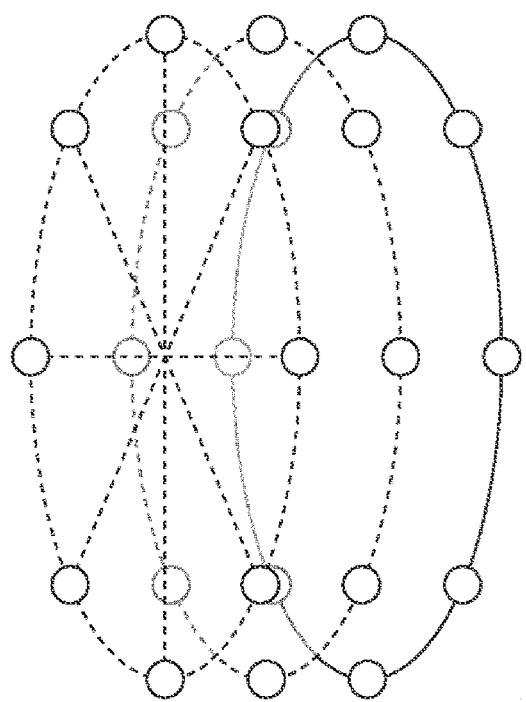
FIG. 3 shows an example of arrangement of cameras.

FIG. 3 shows an example of arrangement of the cameras.

As shown in FIG. 3, the cameras are arranged at various positions such as a position at which the subject is imaged from below, a position at which the subject is imaged from a horizontal direction, and a position at which the subject is imaged from above. One white circle in FIG. 3 indicates one camera.

In the example of FIG. 3, a total of 24 cameras including 8 cameras at an upper stage, 8 cameras at a middle stage, and 8 cameras at a lower stage are arranged as the imaging device 21. The cameras are arranged on a circumference of each stage. Imaging is performed by the 24 cameras having such an arrangement, and thus camera moving images from 24 viewpoints are generated.

Returning to the description of FIG. 2, a camera moving image generated by imaging is subjected to post-processing that is processing such as luminance adjustment, for example, in each of the camera systems 31-1 to 31-$n$. Further, the camera moving image subjected to the post-processing is encoded according to a predetermined standard, and thus the encoded data is generated. The encoded data of each camera system 31 generated by the encoding is transmitted to the server 12.

In the server 12, the encoded data transmitted from each of the camera systems 31-1 to 31-$n$ is decoded, and the camera moving image is restored. Here, it is confirmed whether or not all the camera moving images generated by the camera systems 31-1 to 31-$n$ are prepared. Further, it is also confirmed whether or not synchronization of all the camera moving images is secured.

In a case where it is confirmed that all the camera moving images are prepared and synchronization of the camera moving images is secured, the server 12 performs modeling (three-dimensional reconstruction) of a 3D model by using the plurality of restored camera moving images.

For example, the server 12 extracts a difference between the camera moving images and background moving images, thereby generating silhouette images of extracted subject areas. Further, the server 12 generates the 3D model of the subject by a method such as visual hull using a plurality of silhouette images in different directions and camera parameters.

Data of the 3D model includes the plurality of camera moving images as color information. Further, the data of the 3D model also includes geometry information defining a shape of the 3D model. As the geometry information, it is possible to use depth moving images corresponding to the plurality of camera moving images, a point cloud representing a three-dimensional position of the subject by using a set of points, and a polygon mesh representing the three-dimensional position thereof by using connection between vertices.

Thereafter, rendering is performed on the basis of the 3D model. Thus, a moving image of the 3D model viewed from a viewpoint position specified by the capture system 11 is generated as the free viewpoint moving image. In the generation of the free viewpoint moving image, view dependent rendering for adding a texture according to the viewpoint position (virtual viewpoint position) specified by the capture system 11 to the 3D model is performed by using the plurality of camera moving images. Further, for example, a CG background acquired from the capture system 11 is combined.

The free viewpoint moving image generated by the server 12 as described above is transmitted to the viewing device 14 and is displayed thereon. Note that, in a case where the viewing device 14 includes a head-mounted display, a moving image for the right eye and a moving image for the left eye are transmitted to the viewing device 14.

The free viewpoint moving image may not be generated in the information processing system 1 in a case where a delay occurs because, for example, a camera moving image of any one of the camera systems 31 is not transmitted to the server 12.

Figure 4:
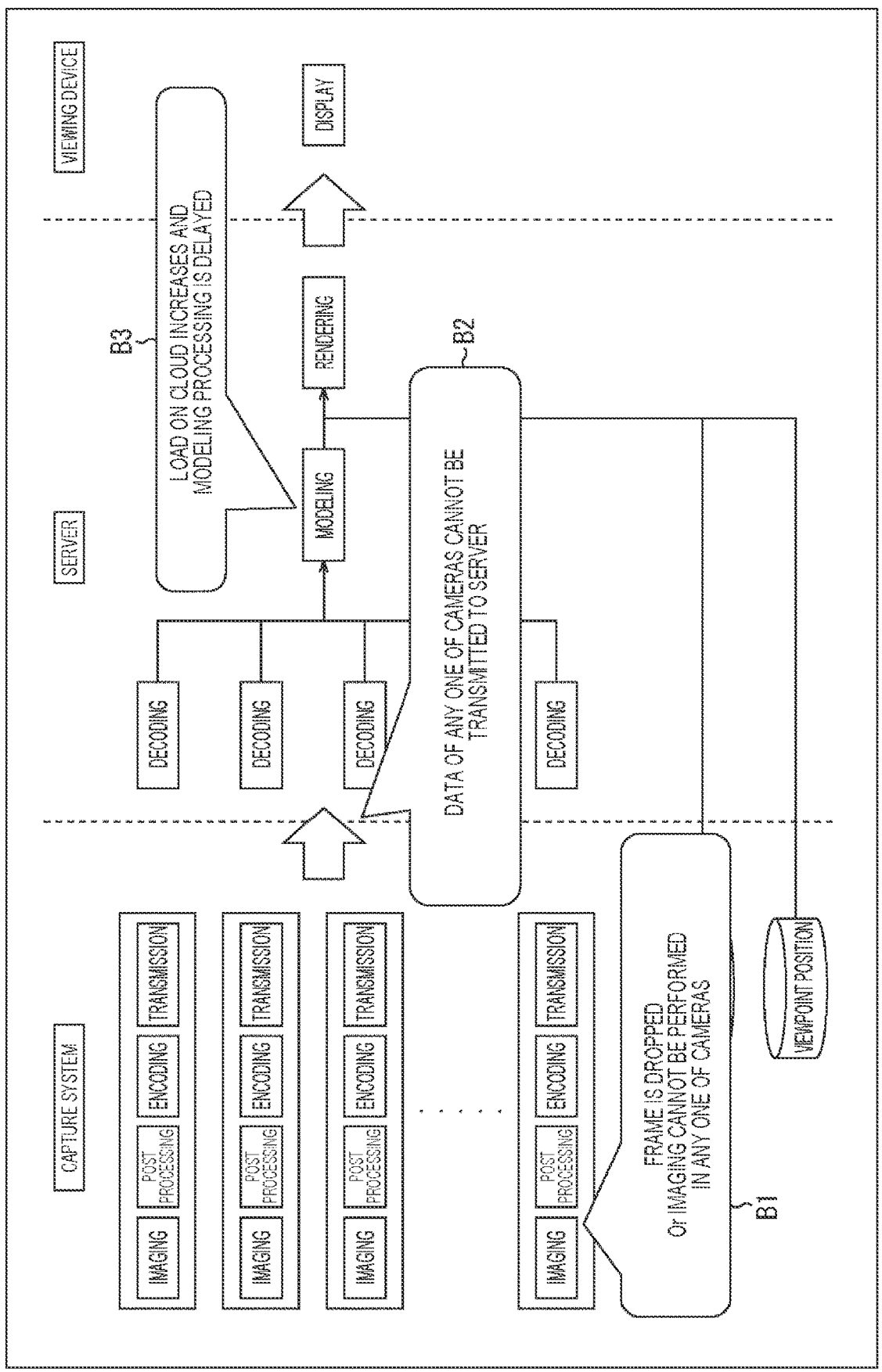
FIG. 4 shows examples of a delay occurring in an information processing system.

FIG. 4 shows examples of failure that causes a delay occurring in the information processing system 1.

As indicated by a balloon B1 of FIG. 4, a delay occurs in the capture system 11 in a case where a frame is dropped in any one of the cameras of the camera systems 31. Further, a delay also occurs in a case where any one of the cameras of the camera systems 31 fails in imaging because, for example, the camera is out of battery.

As described above, in a case where not all the camera systems 31 can simultaneously perform imaging, the free viewpoint moving image may not be generated in the server 12.

Further, as indicated by a balloon B2 of FIG. 4, a delay may occur in transmission of the encoded data from any one of the camera systems 31 to the server 12 due to, for example, a lack of bandwidth.

In a case where a malfunction such as a delay occurs in the transmission of the encoded data, the 3D model may be deformed.

As indicated by a balloon B3 of FIG. 4, modeling processing may be delayed due to an increase in a load on the server 12. The modeling processing takes more time as the number of camera moving images used for the modeling increases. Thus, the modeling processing may be delayed in a case where a large number of camera systems 31 are provided.

In a case where the modeling processing is delayed and no free viewpoint moving image is transmitted, nothing is displayed or only the CG background is displayed on a display of the viewing device 14. In this case, the quality of user experience by communication may deteriorate.

In order to prevent deterioration in the quality of user experience, there is a need for a mechanism that allows the user to continue communication even in a case where a delay occurs.

Figure 5:
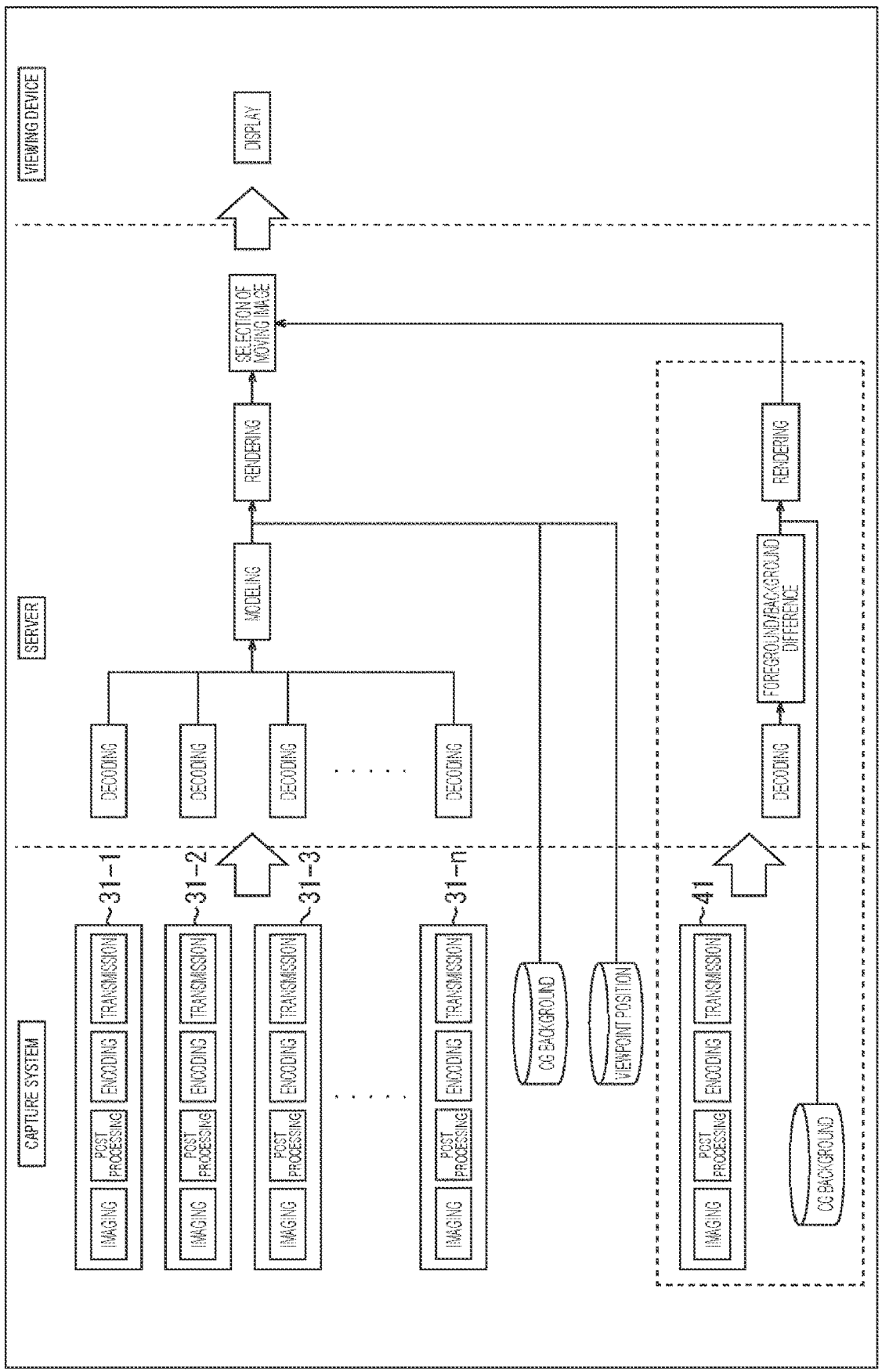
FIG. 5 shows a flow of processing of an information processing system.

FIG. 5 shows a flow of processing of the information processing system 1.

As shown in a lower part of FIG. 5, a camera system 41 that is one camera system having a configuration similar to that of the camera system 31 is provided in the information processing system 1.

The camera system 41, as well as the camera systems 31-1 to 31-n, captures a camera moving image. The camera moving image captured by the camera system 41 is used in the server 12 to generate a real camera viewpoint moving image. The real camera viewpoint moving image is generated while, for example, the free viewpoint moving image is being generated by using the camera moving images of the camera systems 31-1 to 31-n.

The camera system 41 performs processing similar to that performed by the camera systems 31-1 to 31-n. Specifically, the camera moving image captured by the camera of the camera system 41 is subjected to post-processing and encoding, and thus encoded data is generated. The encoded data is transmitted to the server 12.

In the server 12, the encoded data transmitted from the camera system 41 is decoded, and the camera moving image is restored. Further, the restored camera moving image is subjected to foreground/background difference processing, and thus a moving image of the subject area is extracted. Thereafter, the moving image of the subject area and the CG background acquired from the capture system 11 are combined, and thus the real camera viewpoint moving image is generated.

The real camera viewpoint moving image is a moving image including a camera moving image from one viewpoint captured by the camera of the camera system 41.

The information processing system 1 determines whether or not the free viewpoint moving image has been successfully generated. For example, an error occurs in the generation of the free viewpoint moving image due to the failure described with reference to FIG. 4.

That is, the determination regarding the generation of the free viewpoint moving image includes determination on whether or not the camera moving images have been successfully generated in the capture system 11, determination on whether or not a delay occurs in the reception of the encoded data in the server 12, determination on whether or not the encoded data has been successfully decoded in the server 12, and determination on whether or not a delay occurs in the generation of the free viewpoint moving image in the server 12.

For example, either the free viewpoint moving image or the real camera viewpoint moving image is selected in the server 12 as a moving image to be transmitted to the viewing device 14 on the basis of a result of the determination on whether or not the free viewpoint moving image has been successfully generated. The real camera viewpoint moving image may be displayed on the viewing device 14, instead of the free viewpoint moving image.

Figure 6:
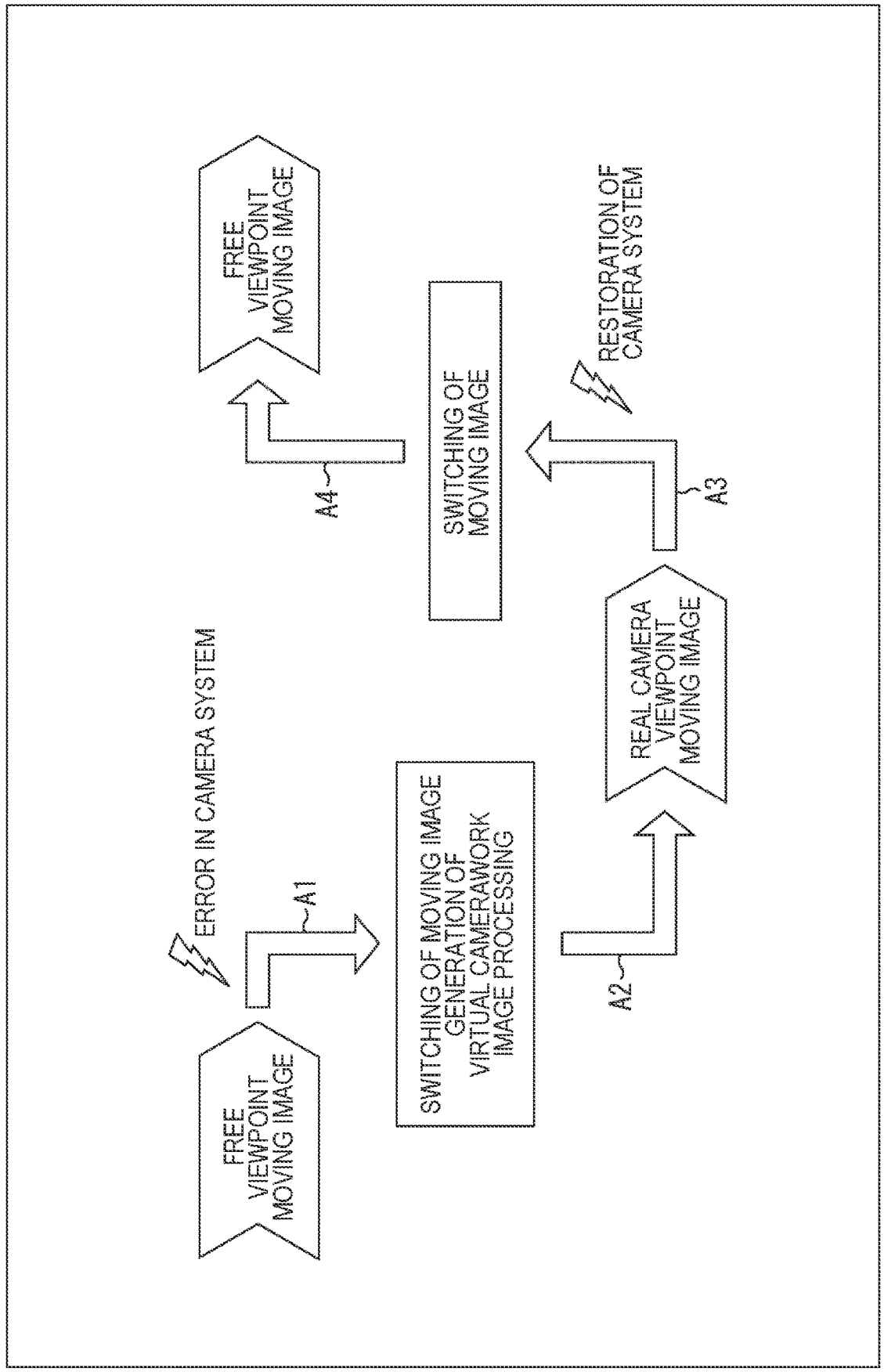
FIG. 6 shows an example of switching of a moving image.

FIG. 6 shows an example of switching of the moving image.

As shown in an upper left part of FIG. 6, the free viewpoint moving image is displayed on the viewing device 14 in a case where no delay occurs in the information processing system 1.

Meanwhile, for example, in a case where an error occurs in any one of the camera systems 31, the moving image to be transmitted to the viewing device 14 is switched to the real camera viewpoint moving image in the server 12 as indicated by an outlined arrow A1.

At the time of switching the moving image to the real camera viewpoint moving image, virtual camerawork is generated and image processing is performed.

The generation of the virtual camerawork is processing for preventing the user from feeling uncomfortable due to switching of the viewpoint position. It is unnatural to suddenly switch the viewpoint from a predetermined virtual viewpoint position of the free viewpoint moving image to a viewpoint position of the real camera viewpoint moving image, and the user of the viewing device 14 may feel uncomfortable.

Specifically, the server 12 generates virtual camerawork that is the shortest route from the virtual viewpoint position before switched to the real camera viewpoint moving image to a position of the camera of the camera system 41 (the viewpoint position of the real camera viewpoint moving image). As the free viewpoint moving image before switched to the real camera viewpoint moving image, a moving image in which the viewpoint moves to approach the viewpoint position of the real camera viewpoint moving image along the virtual camerawork is generated and displayed on the viewing device 14.

The image processing is processing of adding effects such as fade-out and fade-in to both the free viewpoint moving image and the real camera viewpoint moving image.

The above processing is performed by the server 12, and thus the real camera viewpoint moving image is displayed on the viewing device 14 as indicated by an outlined arrow A2.

In a case where, for example, the error is resolved while the real camera viewpoint moving image is being displayed, the moving image to be transmitted to the viewing device 14 is switched to the free viewpoint moving image in the server 12 as indicated by an outlined arrow A3.

After the moving image is switched, the free viewpoint moving image is displayed on the viewing device 14 as indicated by an outlined arrow A4.

Note that, when the real camera viewpoint moving image is switched to the free viewpoint moving image, the moving image can be naturally switched by setting the viewpoint position of the free viewpoint moving image to the viewpoint position of the real camera viewpoint moving image. Therefore, when the real camera viewpoint moving image is switched to the free viewpoint moving image, the moving image is not subjected to image processing such as addition of the effects.

FIG. 7 shows examples of a switching condition between the free viewpoint moving image and the real camera viewpoint moving image.

As shown in the first line of FIG. 7, in some cases, an abnormality such as out-of-synchronization or frame drop occurs in a camera at the time of imaging the subject. The number of cameras in which the abnormality has occurred is determined in the information processing system 1. Further, it is determined whether or not distribution of positions of normal cameras can ensure the quality of the 3D model.

For example, in a case where it is determined that the number of cameras in which the abnormality has occurred is small and the quality of the shape of the 3D model can be ensured, the server 12 performs three-dimensional reconstruction by using camera moving images generated by the normal cameras and generates the free viewpoint moving image. In this case, the free viewpoint moving image is transmitted to the viewing device 14 and is displayed thereon.

Meanwhile, in a case where it is determined that the number of cameras in which the abnormality has occurred is large or the quality of the shape of the 3D model is not ensured, the real camera viewpoint moving image is transmitted to the viewing device 14 and is displayed thereon.

As shown in the second line of FIG. 7, a delay occurs in the transmission of the encoded data of the camera moving images in some cases. Further, the server 12 cannot receive all pieces of the encoded data within a specified time in some cases. The number of pieces of delayed encoded data is determined in the information processing system 1. Further, it is determined whether or not distribution of positions of normal cameras that have generated camera moving images whose encoded data has been normally received can ensure the quality of the 3D model.

For example, in a case where it is determined that the number of pieces of delayed encoded data is small and the quality of the shape of the 3D model can be ensured, the server 12 performs three-dimensional reconstruction by using camera moving images generated by the normal cameras and generates the free viewpoint moving image. In this case, the free viewpoint moving image is transmitted to the viewing device 14 and is displayed thereon.

Meanwhile, in a case where it is determined that the number of pieces of delayed encoded data is large or the quality of the shape of the 3D model is not ensured, the real camera viewpoint moving image is transmitted to the viewing device 14 and is displayed thereon.

As shown in the third line of FIG. 7, the server 12 cannot decode the encoded data transmitted from the capture system 11 in some cases. Further, the encoded data transmitted from the capture system 11 is corrupted in some cases. The number of camera moving images that cannot be restored is determined in the information processing system 1. Further, it is determined whether or not distribution of positions of normal cameras can ensure the quality of the 3D model.

For example, in a case where it is determined that the number of camera moving images that cannot be restored is small and the quality of the shape of the 3D model can be ensured, the server 12 performs three-dimensional reconstruction by using restored camera moving images and generates the free viewpoint moving image. In this case, the free viewpoint moving image is transmitted to the viewing device 14 and is displayed thereon.

Meanwhile, in a case where it is determined that the number of camera moving images that cannot be restored is large or the quality of the shape of the 3D model is not ensured, the real camera viewpoint moving image is transmitted to the viewing device 14 and is displayed thereon.

As shown in the fourth line of FIG. 7, a time required for the modeling processing at the time of generating the 3D model exceeds an allowable time to display the moving image in real time in some cases. In this case, the real camera viewpoint moving image is transmitted to the viewing device 14 and is displayed thereon.

Meanwhile, in a case where the time required for the modeling processing does not exceed the allowable time to display the moving image in real time, the free viewpoint moving image is transmitted to the viewing device 14 and is displayed thereon.

As shown in the fifth line of FIG. 7, an interaction for changing the viewpoint of the free viewpoint moving image is not received from the viewing device 14 in some cases. Whether or not autopilot is set is determined in the information processing system 1. It is possible to automatically set the viewpoint position of the free viewpoint moving image as the autopilot.

For example, in a case where the autopilot is set, the free viewpoint moving image viewed from the viewpoint position selected by the autopilot is transmitted to the viewing device 14 and is displayed thereon.

Meanwhile, in a case where the autopilot is not set, the real camera viewpoint moving image is transmitted to the viewing device 14 and is displayed thereon.

As shown in the sixth line of FIG. 7, malfunctions frequently occur in the information processing system 1 in some cases. For example, in a case where malfunctions occur a threshold number of times or more in a certain period of time, the real camera viewpoint moving image is transmitted to the viewing device 14 and is displayed thereon.

Meanwhile, in a case where the number of times of malfunctions occurring in the certain period of time is less than the threshold, the free viewpoint moving image is transmitted to the viewing device 14 and is displayed thereon.

As described above, whether to transmit the free viewpoint moving image or transmit the real camera viewpoint moving image to the viewing device 14 is selected on the basis of various determination results regarding whether or not the free viewpoint moving image has been successfully generated.

Therefore, even in a case where the free viewpoint moving image is not generated because, for example, an abnormality occurs in a camera, it is possible to display a moving image on the viewing device 14 without interruption.

Further, because the moving image is displayed without interruption, it is possible to provide the user who views the free viewpoint moving image by using the viewing device 14 with better user experience.

2. First Information Processing Example

FIG. 8 shows an example of a flow of information in the information processing system 1.

As shown in FIG. 8, terminal information is supplied from the viewing device 14 to the capture system 11. The terminal information includes information indicating devices included in the viewing device 14, bandwidth information of the viewing device 14, and the like. The bandwidth information indicates communication (e.g., Wi-Fi, 4G, 5G, or the like) used by the viewing device 14. Note that the terminal information may also include information indicating a request from the user who views the moving image by using the viewing device 14.

The capture system 11 determines the number of cameras to perform imaging on the basis of the terminal information supplied from the viewing device 14. Camera moving images generated by the number of cameras determined herein are used for generating the free viewpoint moving image.

Information indicating the virtual viewpoint position is supplied from the capture system 11 to the server 12. That is, in this example, the virtual viewpoint position is specified by the capture system 11. The server 12 generates the free viewpoint moving image in which the subject is viewed from the virtual viewpoint position supplied from the capture system 11.

Configuration of Capture System 11

Figure 9:
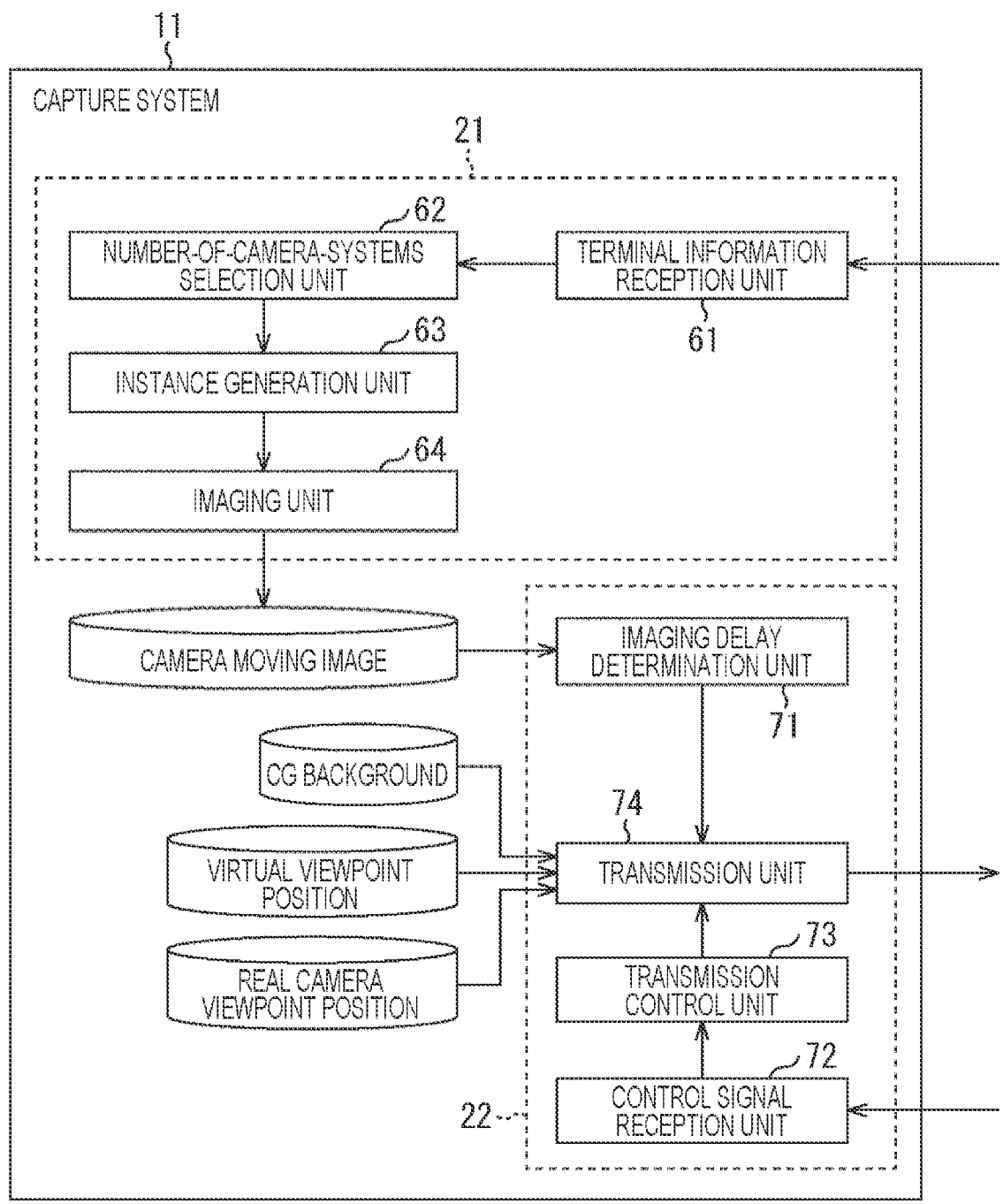
FIG. 9 is a block diagram showing a functional configuration example of a capture system.

FIG. 9 is a block diagram showing a functional configuration example of the capture system 11.

As shown in FIG. 9, the imaging device 21 included in the capture system 11 includes a terminal information reception unit 61, a number-of-camera-systems selection unit 62, an instance generation unit 63, and an imaging unit 64.

The terminal information reception unit 61 controls a communication module or the like compatible with wireless communication or wired communication and receives the terminal information transmitted from the viewing device 14. The terminal information received by the terminal information reception unit 61 is supplied to the number-of-camera-systems selection unit 62.

The number-of-camera-systems selection unit 62 selects the number of cameras (camera systems 31) to perform imaging on the basis of the terminal information supplied from the terminal information reception unit 61. For example, in a case where the viewing device 14 is a smartphone, 15 cameras are selected as the number of cameras to perform imaging. Further, in a case where the viewing device 14 is a high-performance PC, 24 cameras are selected as the number of cameras to perform imaging.

Figure 10:
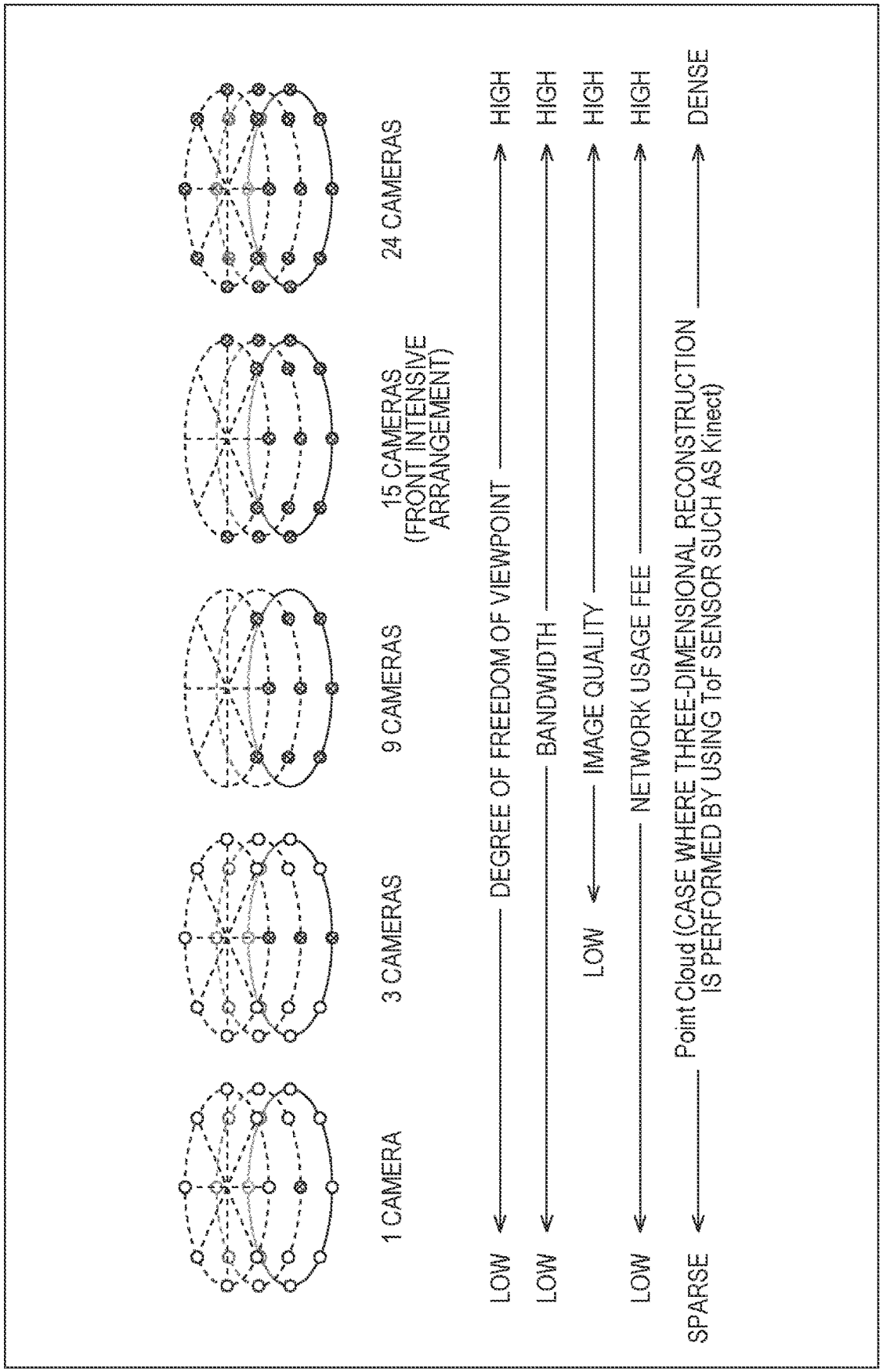
FIG. 10 shows examples of the number of cameras.

FIG. 10 shows examples of the number of cameras.

An upper part of FIG. 10 shows arrangements of cameras in a case where the number of cameras that perform imaging is 1, 3, 9, 15, and 24, respectively. Colored circles in the upper part of FIG. 10 represent cameras that perform imaging. Further, white circles in the upper part of FIG. 10 represent cameras that do not perform imaging.

As shown in a lower part of FIG. 10, as the number of cameras that perform imaging increases, the degree of freedom of the viewpoint of the free viewpoint moving image displayed on the viewing device 14 increases. Further, as the number of cameras that perform imaging increases, an amount of bandwidth used for transmitting the encoded data from the capture system 11 to the server 12 increases.

As the number of cameras that perform imaging increases, image quality of the free viewpoint moving image is improved. Further, as the number of cameras that perform imaging increases, a network usage fee paid by the user increases.

In a case where a depth sensor such as a time of flight (ToF) sensor is used as the camera that performs imaging, the free viewpoint moving image is represented as a point cloud. As the number of ToF sensors increases, points included in the point cloud are denser.

As shown in a left end of FIG. 10, in a case where there is one camera that performs imaging, there is no degree of freedom of the viewpoint of the free viewpoint moving image. In this case, a camera moving image captured by the one camera or a moving image obtained by combining the subject appearing in the camera moving image with a CG background is displayed on the viewing device 14.

In a case where three cameras that perform imaging are arranged in a vertical direction, a moving image that can be stereoscopically viewed from one viewpoint is generated as the free viewpoint moving image. In this case, a motion parallax can be expressed in the free viewpoint moving image by using distances from positions of the three cameras to the subject.

In a case where the number of cameras that perform imaging is nine, the free viewpoint moving image is generated on the basis of a 3D model having moderate shape reproducibility. The free viewpoint moving image also has moderate image quality.

In a case where 15 cameras that perform imaging are intensively arranged in front of the subject, the free viewpoint moving image is generated on the basis of a 3D model having high reproducibility of a front shape of the subject. However, the 3D model has low reproducibility of a back shape of the subject, and thus it is necessary to restrict the viewpoint position so as not to show the back side of the subject.

In a case where the number of cameras that perform imaging is 24, a high quality free viewpoint moving image is generated on the basis of a 3D model having high reproducibility of the whole shape of the subject. In a case where a resolution of the camera moving image is 4K, a higher quality free viewpoint moving image is generated.

Information indicating the number of cameras selected as described above is supplied from the number-of-camera-systems selection unit 62 to the instance generation unit 63 of FIG. 9.

The instance generation unit 63 sets camera parameters (intrinsic parameter and extrinsic parameter) on the basis of the information supplied from the number-of-camera-systems selection unit 62 and supplies information indicating the settings to the imaging unit 64.

The imaging unit 64 selects cameras to perform imaging in accordance with the information supplied from the instance generation unit 63 and performs imaging. A plurality of camera moving images captured by the imaging unit 64 is supplied to the transmission device 22.

As shown in FIG. 9, the transmission device 22 includes an imaging delay determination unit 71, a control signal reception unit 72, a transmission control unit 73, and a transmission unit 74.

The imaging delay determination unit 71 determines whether or not the camera moving images have been successfully generated on the basis of the plurality of camera moving images supplied from the imaging unit 64, respectively. Specifically, the imaging delay determination unit 71 determines whether or not an abnormality has occurred in each camera at the time of imaging. The imaging delay determination unit 71 supplies, to the transmission unit 74, results of the determination on whether or not the camera moving images have been successfully generated together with the plurality of camera moving images.

The control signal reception unit 72 receives a control signal transmitted from the server 12 and supplies the control signal to the transmission control unit 73. The control signal is a signal specifying camera moving images to be transmitted from the transmission unit 74.

The transmission control unit 73 controls the transmission unit 74 and causes the transmission unit 74 to transmit the camera moving images specified by the control signal.

The control signal specifies whether to transmit multi-view camera moving images or transmit one-view camera moving image. The multi-view camera moving images are camera moving images generated by a plurality of cameras and used for generating the free viewpoint moving image. The one-view camera moving image is a specific camera moving image generated by the one camera included in the camera system 41 and used for generating the real camera viewpoint moving image.

The transmission unit 74 transmits the determination results supplied from the imaging delay determination unit 71 to the server 12.

The transmission unit 74 also functions as an encoding unit that encodes the camera moving images. The transmission unit 74 encodes the camera moving images supplied from the imaging delay determination unit 71 to generate encoded data.

Further, the transmission unit 74 transmits the encoded data together with a CG background, information indicating the virtual viewpoint position, and information indicating a real camera viewpoint position under the control of the transmission control unit 73. The real camera viewpoint position is a viewpoint position of the real camera viewpoint moving image.

In a case where transmission of the multi-view camera moving images is specified by the control signal, the transmission unit 74 transmits the encoded data of the multi-view camera moving images together with various pieces of information.

Meanwhile, in a case where transmission of the one-view camera moving image is specified by the control signal, the transmission unit 74 selects a specific camera moving image generated by a camera arranged at the real camera viewpoint position as the one-view camera moving image among from the multi-view camera moving images. Encoded data of the selected one-view camera moving image is transmitted together with various pieces of information.

Note that each camera moving image is associated with camera parameters of the camera that has generated the camera moving image. The camera parameters associated with the camera moving image are also transmitted to the server 12 as the encoded data.

The camera that captures the camera moving image used for generating the real camera viewpoint moving image may be provided separately from the cameras that capture the camera moving images used for generating the free viewpoint moving image. That is, the camera system 41 may be any one of the camera systems 31-1 to 31-n or may be a camera system separately provided from the camera systems 31-1 to 31-n.

In a case where the camera that captures the camera moving image used for generating the real camera viewpoint moving image is separately provided from the cameras that capture the camera moving images used for generating the free viewpoint moving image, both the multi-view camera moving images and the one-view camera moving image are transmitted to the server 12. The camera for the real camera viewpoint moving image may be a handheld camera such as a video camera or a smartphone.

Configuration of Server 12

Figure 11:
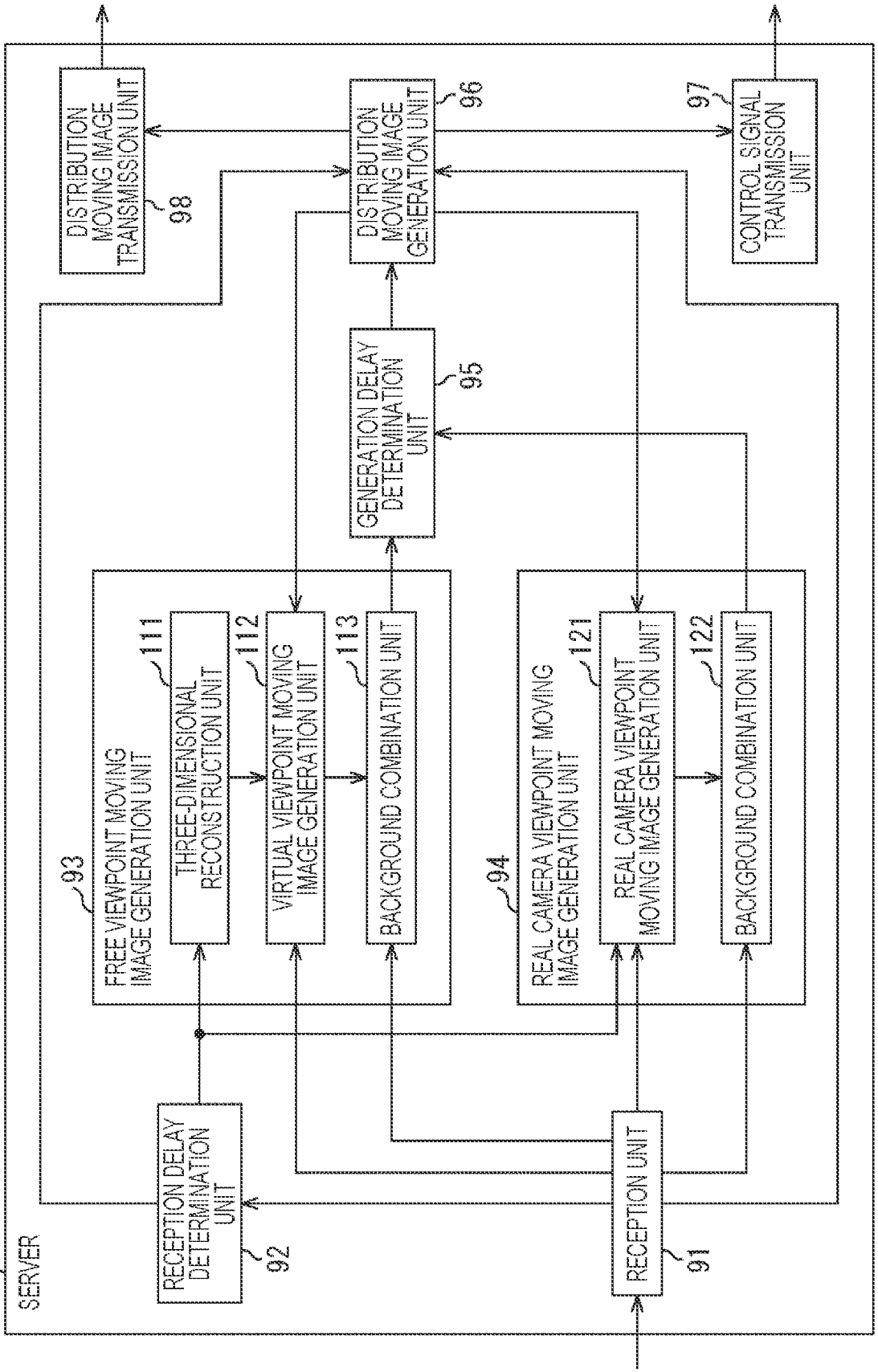
FIG. 11 is a block diagram showing a functional configuration example of a server.

FIG. 11 is a block diagram showing a functional configuration example of the server 12.

As shown in FIG. 11, the server 12 includes a reception unit 91, a reception delay determination unit 92, a free viewpoint moving image generation unit 93, a real camera viewpoint moving image generation unit 94, a generation delay determination unit 95, a distribution moving image generation unit 96, a control signal transmission unit 97, and a distribution moving image transmission unit 98.

The reception unit 91 controls a communication module or the like compatible with wireless communication or wired communication and receives the determination results obtained by the imaging delay determination unit 71 (FIG. 9) and transmitted from the capture system 11. The determination results received by the reception unit 91 are supplied to the distribution moving image generation unit 96.

Further, the reception unit 91 receives the encoded data transmitted from the capture system 11 and decodes the encoded data. The camera moving images restored by decoding the encoded data are supplied to the reception delay determination unit 92. The reception unit 91 also functions as a decoding unit that decodes the encoded data to restore the camera moving images.

The reception unit 91 receives the CG background, the information indicating the virtual viewpoint position, and the information indicating the real camera viewpoint position transmitted from the capture system 11. The CG background is supplied to a background combination unit 113 of the free viewpoint moving image generation unit 93 and a background combination unit 122 of the real camera viewpoint moving image generation unit 94. The information indicating the virtual viewpoint position is supplied to a virtual viewpoint moving image generation unit 112 of the free viewpoint moving image generation unit 93. The information indicating the real camera viewpoint position is supplied to a real camera viewpoint moving image generation unit 121 of the real camera viewpoint moving image generation unit 94.

The reception delay determination unit 92 determines whether or not a delay occurs in reception of the plurality of pieces of encoded data. Further, the reception delay determination unit 92 determines whether or not the camera moving images supplied from the reception unit 91 are corrupted. That is, the reception delay determination unit 92 can also function as a decoding determination unit that determines whether or not the encoded data has been successfully decoded. The reception delay determination unit 92 supplies determination results thereof to the distribution moving image generation unit 96.

In a case where the multi-view camera moving images are supplied from the reception unit 91, the reception delay determination unit 92 supplies the multi-view camera moving images to a three-dimensional reconstruction unit 111 of the free viewpoint moving image generation unit 93 and the real camera viewpoint moving image generation unit 121 of the real camera viewpoint moving image generation unit 94.

Meanwhile, in a case where the one-view camera moving image is supplied from the reception unit 91, the reception delay determination unit 92 supplies the one-view camera moving image only to the real camera viewpoint moving image generation unit 121.

The free viewpoint moving image generation unit 93 includes the three-dimensional reconstruction unit 111, the virtual viewpoint moving image generation unit 112, and the background combination unit 113.

The three-dimensional reconstruction unit 111 generates the 3D model of the subject on the basis of the multi-view camera moving images supplied from the reception delay determination unit 92 and supplies the 3D model to the virtual viewpoint moving image generation unit 112.

The virtual viewpoint moving image generation unit 112 generates the free viewpoint moving image of the virtual viewpoint specified by the information supplied from the reception unit 91 under the control of the distribution moving image generation unit 96. Specifically, the virtual viewpoint moving image generation unit 112 performs the rendering processing to generate a moving image of the 3D model viewed from the specified virtual viewpoint as the free viewpoint moving image.

In a case where the virtual camerawork is supplied from the distribution moving image generation unit 96, the virtual viewpoint moving image generation unit 112 generates the free viewpoint moving image in which the viewpoint moves to approach the real camera viewpoint position on the basis of the virtual camerawork. The free viewpoint moving image generated by the virtual viewpoint moving image generation unit 112 is supplied to the background combination unit 113.

The background combination unit 113 combines the CG background supplied from the reception unit 91 with the free viewpoint moving image supplied from the virtual viewpoint moving image generation unit 112. The free viewpoint moving image combined with the CG background is supplied to the generation delay determination unit 95.

The real camera viewpoint moving image generation unit 94 includes the real camera viewpoint moving image generation unit 121 and the background combination unit 122.

The real camera viewpoint moving image generation unit 121 generates the real camera viewpoint moving image under the control of the distribution moving image generation unit 96. Specifically, the real camera viewpoint moving image generation unit 121 performs the foreground/background difference processing to extract a moving image of the subject area from the one-view camera moving image as the real camera viewpoint moving image.

In a case where the multi-view camera moving images are supplied from the reception delay determination unit 92, the real camera viewpoint moving image generation unit 121 selects a specific camera moving image as the one-view camera moving image from among the multi-view camera moving images on the basis of the information indicating the real camera viewpoint position. The one-view camera moving image selected by the real camera viewpoint moving image generation unit 121 is used for generating the real camera viewpoint moving image.

Meanwhile, in a case where the one-view camera moving image is supplied from the reception delay determination unit 92, the real camera viewpoint moving image generation unit 121 generates the real camera viewpoint moving image by using the camera moving image. The real camera viewpoint moving image generated by the real camera viewpoint moving image generation unit 121 is supplied to the background combination unit 122.

The background combination unit 122 combines the CG background supplied from the reception unit 91 with the real camera viewpoint moving image supplied from the real camera viewpoint moving image generation unit 121. The real camera viewpoint moving image combined with the CG background is supplied to the generation delay determination unit 95.

The generation delay determination unit 95 determines whether or not a delay occurs in the generation of the free viewpoint moving image and supplies the determination result to the distribution moving image generation unit 96. For example, in a case where a frame rate of the moving image displayed on the viewing device 14 is 60 fps, it is necessary to generate the free viewpoint moving image within 16 msec. Therefore, in a case where the free viewpoint moving image is generated within 16 msec, it is determined that no delay occurs in the generation of the free viewpoint moving image.

Further, the generation delay determination unit 95 supplies the free viewpoint moving image supplied from the background combination unit 113 and the real camera viewpoint moving image supplied from the background combination unit 122 to the distribution moving image generation unit 96.

The distribution moving image generation unit 96 functions as a control unit that controls each configuration provided in the information processing system 1 on the basis of the results of determination on whether or not the free viewpoint moving image has been successfully generated, the results having been supplied from various determination units provided in the information processing system 1.

Specifically, the distribution moving image generation unit 96 selects whether to cause the capture system 11 to transmit the multi-view camera moving images or transmit the one-view camera moving image on the basis of the determination results obtained by the imaging delay determination unit 71 and supplied from the reception unit 91. The distribution moving image generation unit 96 generates a control signal specifying the camera moving images to be transmitted from the capture system 11.

The control signal generated by the distribution moving image generation unit 96 is supplied to the control signal transmission unit 97. The control signal transmission unit 97 transmits the control signal supplied from the distribution moving image generation unit 96 to the capture system 11.

Further, the distribution moving image generation unit 96 determines whether or not the number and positions of normal cameras can ensure the quality of the shape of the 3D model on the basis of the determination results obtained by the reception delay determination unit 92.

The distribution moving image generation unit 96 selects whether to cause the virtual viewpoint moving image generation unit 112 to generate the free viewpoint moving image on the basis of the determination result obtained by the distribution moving image generation unit itself. The distribution moving image generation unit 96 controls the virtual viewpoint moving image generation unit 112 and the real camera viewpoint moving image generation unit 121 in accordance with the selection result.

Further, the distribution moving image generation unit 96 selects whether to transmit the free viewpoint moving image or transmit the real camera viewpoint moving image on the basis of the determination result obtained by the generation delay determination unit 95.

Note that, in a case where the moving image to be transmitted to the viewing device 14 is switched from the free viewpoint moving image to the real camera viewpoint moving image, the distribution moving image generation unit 96 generates the virtual camerawork and supplies the virtual camerawork to the virtual viewpoint moving image generation unit 112.

The distribution moving image transmission unit 98 transmits the free viewpoint moving image or the real camera viewpoint moving image supplied from the distribution moving image generation unit 96 to the viewing device 14.

Configuration of Viewing Device 14

Figure 12:
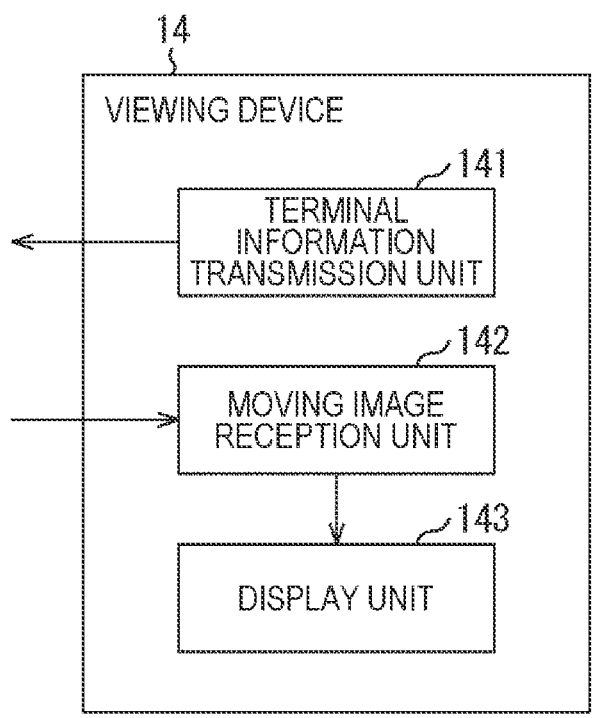
FIG. 12 is a block diagram showing a functional configuration example of a viewing device.

FIG. 12 is a block diagram showing a functional configuration example of the viewing device 14.

As shown in FIG. 12, the viewing device 14 includes a terminal information transmission unit 141, a moving image reception unit 142, and a display unit 143.

The terminal information transmission unit 141 controls a communication module or the like compatible with wireless communication or wired communication and transmits the terminal information to the capture system 11.

The moving image reception unit 142 receives the free viewpoint moving image or the real camera viewpoint moving image transmitted from the server 12 and supplies the free viewpoint moving image or the real camera viewpoint moving image to the display unit 143.

The display unit 143 displays the moving image supplied from the moving image reception unit 142 on a display.

Operation of Each Device

Here, processing performed in the information processing system 1 having the above configuration will be described.

Figure 13:
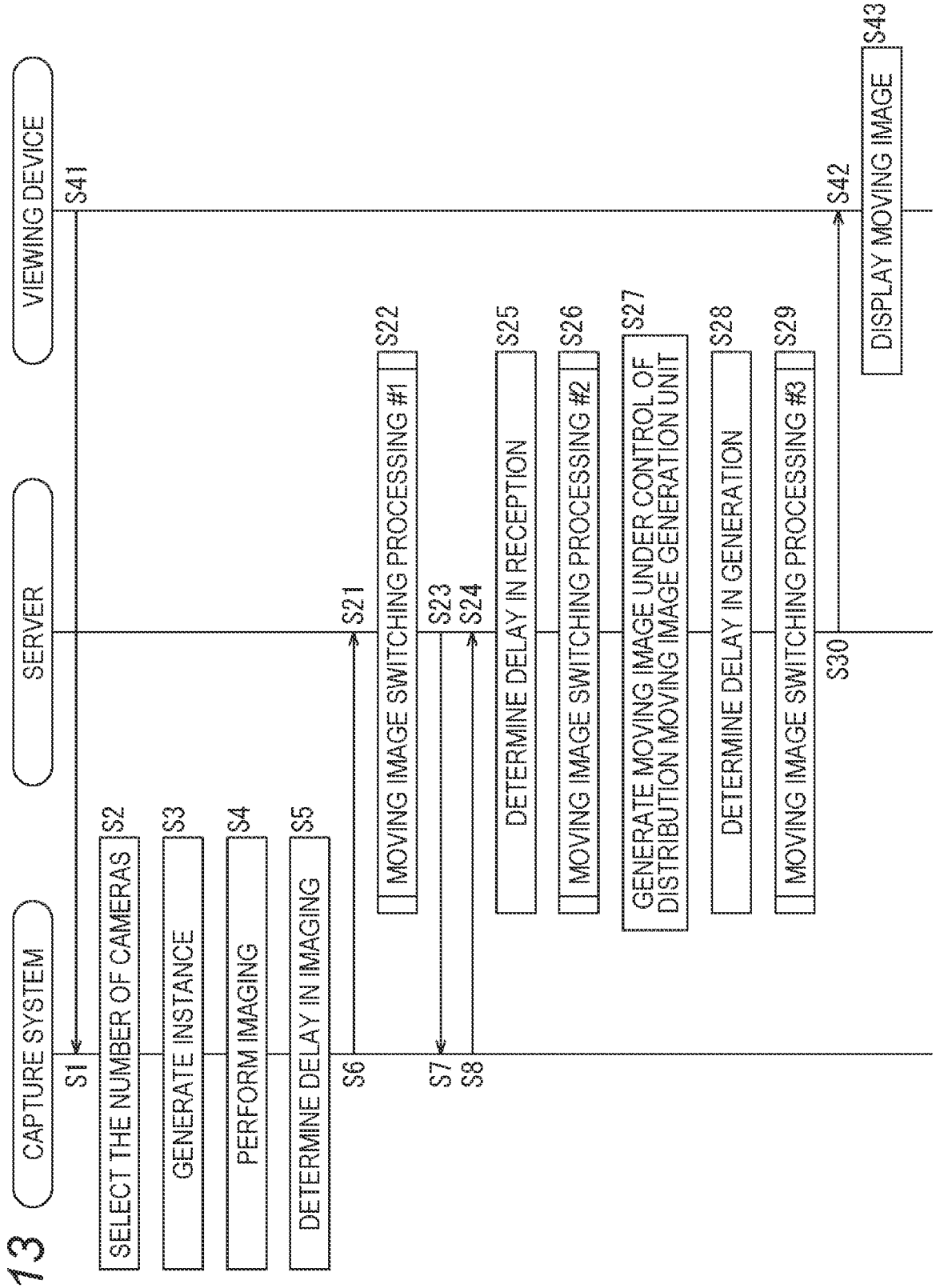
FIG. 13 is a sequence diagram showing a flow of processing performed by a capture system, a server, and a viewing device.

FIG. 13 is a sequence diagram showing a flow of processing performed by the capture system 11, the server 12, and the viewing device 14.

In step S41, the terminal information transmission unit 141 of the viewing device 14 transmits the terminal information of the viewing device 14 to the capture system 11.

In step S1, the terminal information reception unit 61 of the capture system 11 receives the terminal information transmitted from the viewing device 14.

In step S2, the number-of-camera-systems selection unit 62 of the capture system 11 selects the number of cameras to perform imaging on the basis of the terminal information.

In step S3, the instance generation unit 63 of the capture system 11 sets camera parameters and generates an instance.

In step S4, the imaging unit 64 of the capture system 11 images the subject by using the number of cameras selected in step S2 and acquires camera moving images.

In step S5, the imaging delay determination unit 71 of the capture system 11 determines whether or not the camera moving images have been successfully generated by the imaging unit 64.

In step S6, the transmission unit 74 of the capture system 11 transmits the determination results to the server 12.

In step S21, the reception unit 91 of the server 12 receives the determination results obtained by the imaging delay determination unit 71 and transmitted from the capture system 11.

In step S22, the distribution moving image generation unit 96 of the server 12 performs moving image switching processing #1. By the moving image switching processing #1, a control signal is generated on the basis of the determination results obtained by the imaging delay determination unit 71 of the capture system 11. The moving image switching processing #1 will be described later with reference to a flowchart of FIG. 14.

In step S23, the control signal transmission unit 97 of the server 12 transmits the control signal to the capture system 11.

In step 7, the control signal reception unit 72 of the capture system 11 receives the control signal transmitted from the server 12.

In step S8, the transmission unit 74 of the capture system 11 generates encoded data by encoding the camera moving images generated in step S4. The transmission unit 74 transmits the encoded data together with a CG background, information indicating the virtual viewpoint position, and information indicating the real camera viewpoint position to the server 12 in response to the control signal.

In step S24, the reception unit 91 of the server 12 receives the encoded data, the CG background, the information indicating the virtual viewpoint position, and the information indicating the real camera viewpoint position transmitted from the capture system 11. The reception unit 91 decodes the encoded data to restore the camera moving images.

In step S25, the reception delay determination unit 92 of the server 12 determines whether or not a delay occurs in the reception of the encoded data and whether or not the camera moving images have been successfully restored.

In step S26, the distribution moving image generation unit 96 of the server 12 performs moving image switching processing #2. By the moving image switching processing #2, generation of a free viewpoint moving image is controlled on the basis of the determination results obtained by the reception delay determination unit 92. The moving image switching processing #2 will be described later with reference to a flowchart of FIG. 15.

In step S27, the free viewpoint moving image generation unit 93 of the server 12 generates a free viewpoint moving image under the control of the distribution moving image generation unit 96. Further, the real camera viewpoint moving image generation unit 94 of the server 12 generates a real camera viewpoint moving image under the control of the distribution moving image generation unit 96.

In step S28, the generation delay determination unit 95 of the server 12 determines whether or not a delay occurs in the generation of the free viewpoint moving image performed in step S27.

In step S29, the distribution moving image generation unit 96 of the server 12 performs moving image switching processing #3. By the moving image switching processing #3, whether to transmit the free viewpoint moving image or transmit the real camera viewpoint moving image is controlled on the basis of the determination result obtained by the generation delay determination unit 95. The moving image switching processing #3 will be described later with reference to a flowchart of FIG. 16.

In step S30, the distribution moving image transmission unit 98 of the server 12 transmits the free viewpoint moving image or the real camera viewpoint moving image to the viewing device 14 under the control of the distribution moving image generation unit 96.

In step S42, the moving image reception unit 142 of the viewing device 14 receives the moving image transmitted from the server 12.

In step S43, the display unit 143 of the viewing device 14 displays the moving image transmitted from the server 12 on the display.

Figure 14:
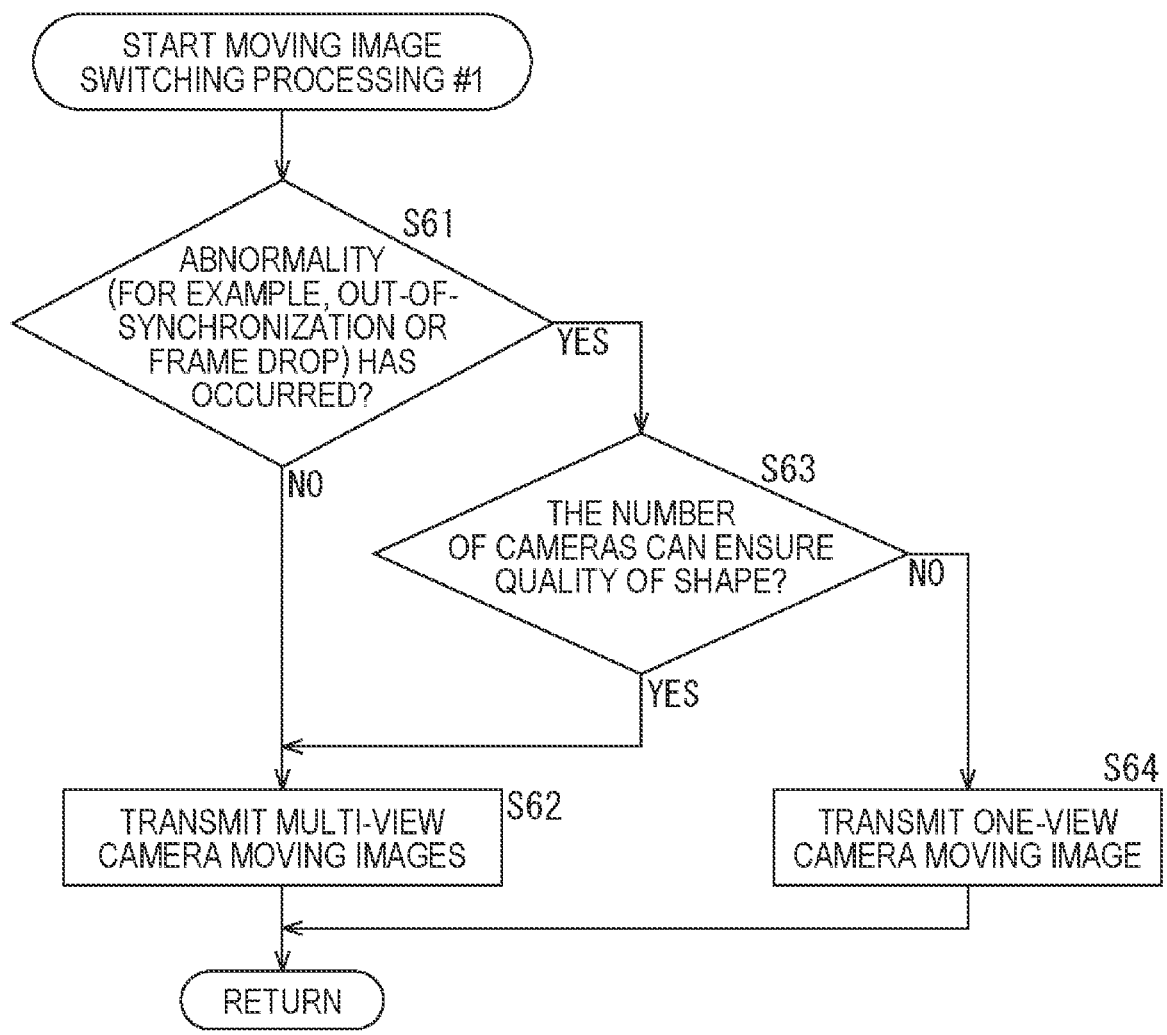
FIG. 14 is a flowchart showing moving image switching processing #1.

Next, the moving image switching processing #1 performed in step S22 of FIG. 13 will be described with reference to the flowchart of FIG. 14.

In step S61, determination is made in accordance with the determination results obtained by the imaging delay determination unit 71 in step S5 of FIG. 13, and, in a case where the imaging delay determination unit 71 determines that no abnormality has occurred in the imaging unit 64, the processing proceeds to step S62.

In step S62, the distribution moving image generation unit 96 of the server 12 generates a control signal for transmitting multi-view camera moving images. Thereafter, the processing returns to step S22 of FIG. 13, and the processing in step S22 and subsequent steps is performed.

Meanwhile, in step S61, in a case where the imaging delay determination unit 71 determines that an abnormality has occurred in the imaging unit 64, the processing proceeds to step S63.

In step S63, the distribution moving image generation unit 96 of the server 12 determines whether or not the number and distribution of normal cameras can ensure the quality of the shape of the 3D model. In order to ensure the quality of the shape of the 3D model, multi-view camera moving images generated by a plurality of cameras each arranged at a predetermined position are required. The distribution moving image generation unit 96 confirms the distribution of the normal cameras by using camera parameters of the normal cameras.

The capture system 11 may specify a camera necessary for generating the 3D model. In this case, in a case where an abnormality occurs in the specified necessary camera, it is determined that the number and distribution of normal cameras cannot ensure the quality of the shape of the 3D model. For example, a zoom camera provided in front of the subject is specified as the camera necessary for generating the 3D model.

In a case where it is determined in step S63 that the number and distribution of normal cameras can ensure the quality of the shape of the 3D model, the processing proceeds to step S62.

Meanwhile, in a case where it is determined in step S63 that the number and distribution of normal cameras cannot ensure the quality of the shape of the 3D model, the processing proceeds to step S64.

In step S64, the distribution moving image generation unit 96 of the server 12 generates a control signal for transmitting the one-view camera moving image. Thereafter, the processing returns to step S22 of FIG. 13, and the processing in step S22 and subsequent steps is performed.

Figure 15:
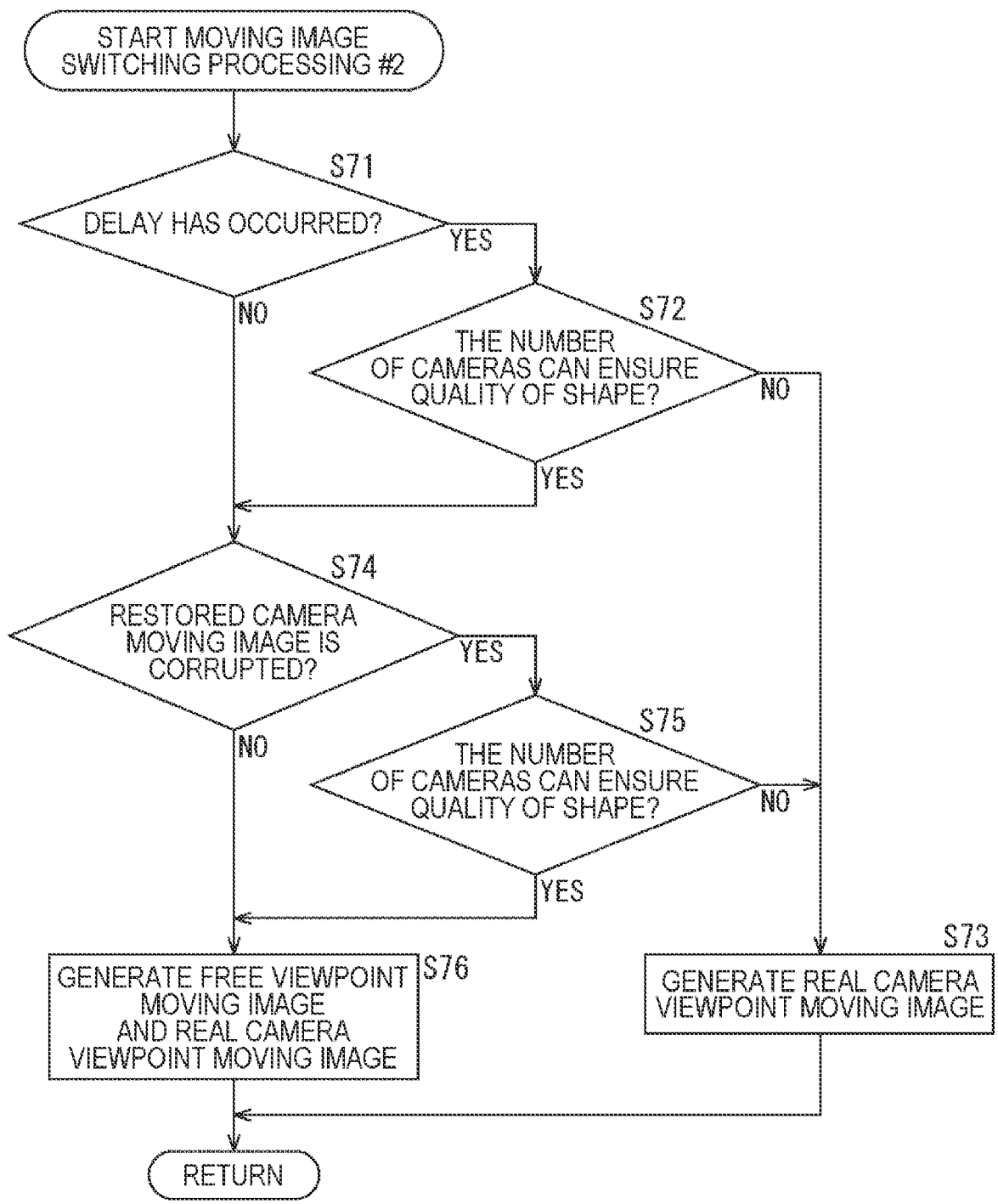
FIG. 15 is a flowchart showing moving image switching processing #2.

Next, the moving image switching processing #2 performed in step S26 of FIG. 13 will be described with reference to the flowchart of FIG. 15.

In step S71, determination is made in accordance with the determination result obtained by the reception delay determination unit 92 in step S25 of FIG. 13, and, in a case where the reception delay determination unit 92 determines that no delay occurs in the reception of the encoded data, the processing proceeds to step S72.

In step S72, the distribution moving image generation unit 96 of the server 12 determines whether or not the number and distribution of normal cameras can ensure the quality of the shape of the 3D model. The distribution moving image generation unit 96 confirms the distribution of the normal cameras by using the camera parameters of the normal cameras.

In a case where it is determined in step S72 that the number and distribution of normal cameras cannot ensure the quality of the shape of the 3D model, the processing proceeds to step S73.

In step S73, the distribution moving image generation unit 96 of the server 12 performs control not to cause the virtual viewpoint moving image generation unit 112 to generate the free viewpoint moving image. Further, the distribution moving image generation unit 96 performs control to cause the real camera viewpoint moving image generation unit 121 to generate the real camera viewpoint moving image. Thereafter, the processing returns to step S26 of FIG. 13, and the processing in step S26 and subsequent steps is performed.

Meanwhile, in a case where it is determined in step S72 that the number and distribution of normal cameras can ensure the quality of the shape of the 3D model, the processing proceeds to step S74. Similarly, in a case where the reception delay determination unit 92 determines in step S71 that no delay occurs in the reception of the encoded data, the processing also proceeds to step S72.

In step S74, determination is made in accordance with the determination results obtained by the reception delay determination unit 92 in step S25 of FIG. 13, and, in a case where the reception delay determination unit 92 determines that a restored camera moving image is corrupted, the processing proceeds to step S75.

In step S75, the distribution moving image generation unit 96 of the server 12 determines whether or not the number and distribution of normal cameras can ensure the quality of the shape of the 3D model. The distribution moving image generation unit 96 confirms the distribution of the normal cameras by using the camera parameters of the normal cameras.

In a case where it is determined in step S75 that the number and distribution of normal cameras cannot ensure the quality of the shape of the 3D model, the processing proceeds to step S73.

Meanwhile, in a case where it is determined in step S75 that the number and distribution of normal cameras can ensure the quality of the shape of the 3D model, the processing proceeds to step S76. Further, similarly, in a case where the reception delay determination unit 92 determines in step S74 that no restored camera moving image is corrupted, the processing also proceeds to step S76.

In step S76, the distribution moving image generation unit 96 of the server 12 performs control to cause the virtual viewpoint moving image generation unit 112 to generate the free viewpoint moving image. Further, the distribution moving image generation unit 96 performs control to cause the real camera viewpoint moving image generation unit 121 to generate the real camera viewpoint moving image. Thereafter, the processing returns to step S22 of FIG. 13, and the processing in step S22 and subsequent steps is performed.

Figure 16:
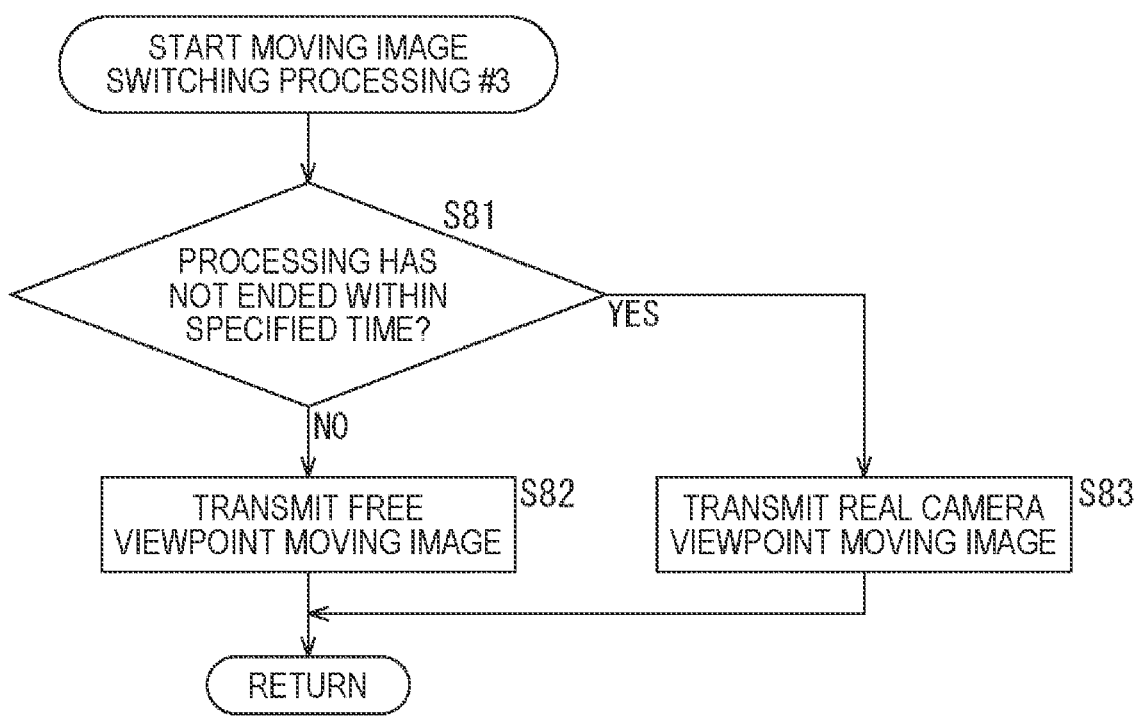
FIG. 16 is a flowchart showing moving image switching processing #3.

Next, the moving image switching processing #3 performed in step S29 of FIG. 13 will be described with reference to the flowchart of FIG. 16.

In step S81, determination is made in accordance with the determination result obtained by the generation delay determination unit 95 in step S28 of FIG. 13, and, in a case where the generation delay determination unit 95 determines that processing of generating the free viewpoint moving image has ended within a specified time, the processing proceeds to step S82.

In step S82, the distribution moving image generation unit 96 of the server 12 performs control to cause the distribution moving image transmission unit 98 to transmit the free viewpoint moving image. Thereafter, the processing returns to step S29 of FIG. 13, and the processing in step S29 and subsequent steps is performed.

Meanwhile, in a case where the generation delay determination unit 95 determines in step S81 that the processing of generating the free viewpoint moving image has not ended within the specified time, the processing proceeds to step S83.

In step S83, the distribution moving image generation unit 96 of the server 12 performs control to cause the distribution moving image transmission unit 98 to transmit the real camera viewpoint moving image. Thereafter, the processing returns to step S29 of FIG. 13, and the processing in step S29 and subsequent steps is performed.

With the above processing, even in a case where the free viewpoint moving image is not generated because, for example, an abnormality occurs in a camera, the server 12 can display a moving image on the viewing device 14 without interruption.

Because the camera moving images to be transmitted to the server 12 are controlled on the basis of the determination results obtained by the imaging delay determination unit 71, it is possible to reduce the amount of bandwidth used for transmitting the camera moving images.

Because the generation of the free viewpoint moving image is controlled on the basis of the determination results obtained by the reception delay determination unit 92, it is possible to reduce a load of the processing performed in the server 12.

3. Second Information Processing Example

Figure 17:
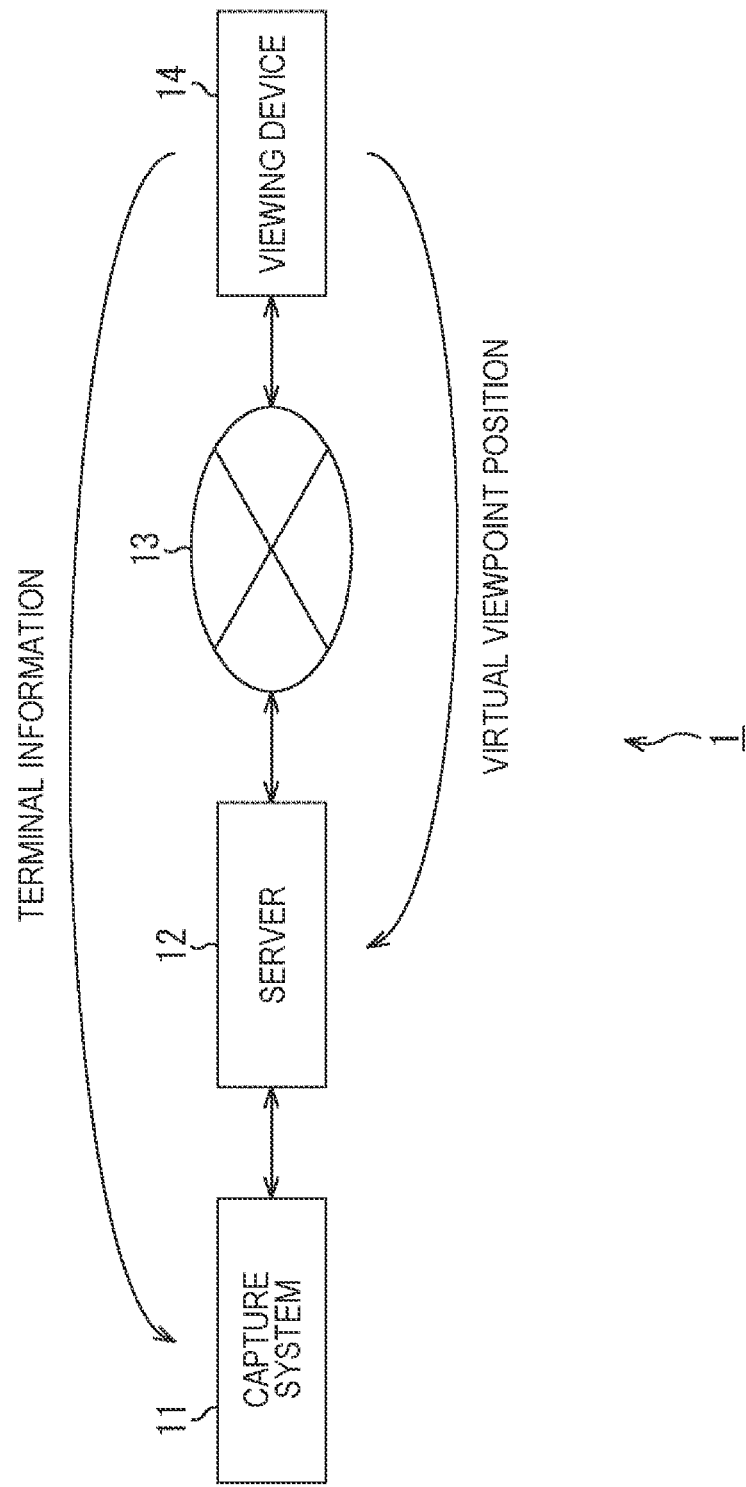
FIG. 17 shows another example of a flow of information in an information processing system.

FIG. 17 shows another example of the flow of the information in the information processing system 1.

As shown in FIG. 17, the terminal information may be supplied from the viewing device 14 to the capture system 11, and the information indicating the virtual viewpoint position specified by the viewing device 14 may be supplied to the server 12.

Figure 18:
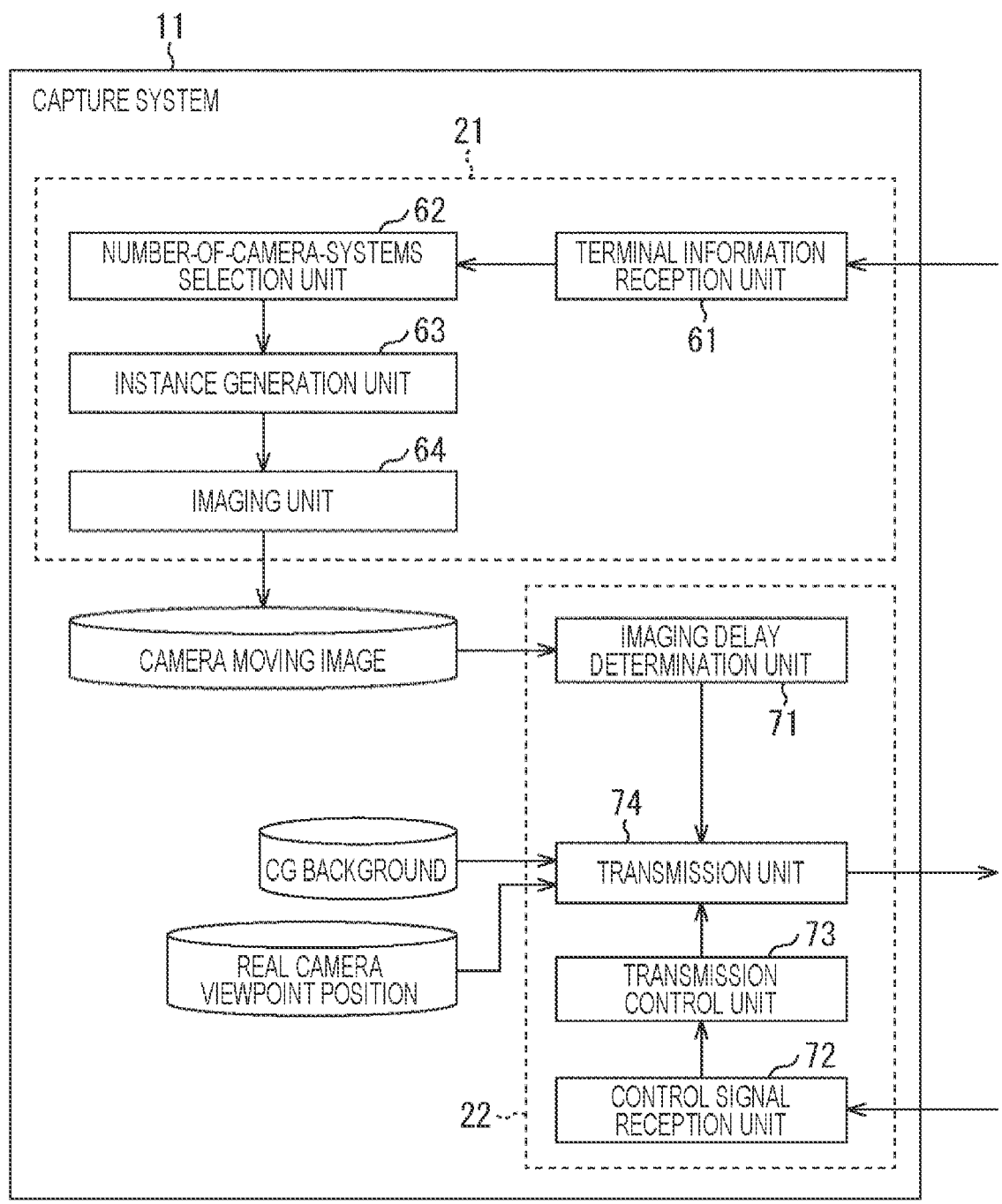
FIG. 18 is a block diagram showing a second functional configuration example of a capture system.

FIG. 18 is a block diagram showing a second functional configuration example of the capture system 11.

In FIG. 18, the same components as those of the capture system 11 in FIG. 9 are denoted by the same reference signs. Redundant description will be omitted as appropriate.

The configuration of the capture system 11 in FIG. 18 is different from the configuration described with reference to FIG. 9 in that the transmission unit 74 does not acquire the CG background.

The transmission unit 74 transmits the encoded data together with the CG background and the information indicating the real camera viewpoint position to the server 12 under the control of the transmission control unit 73.

Figure 19:
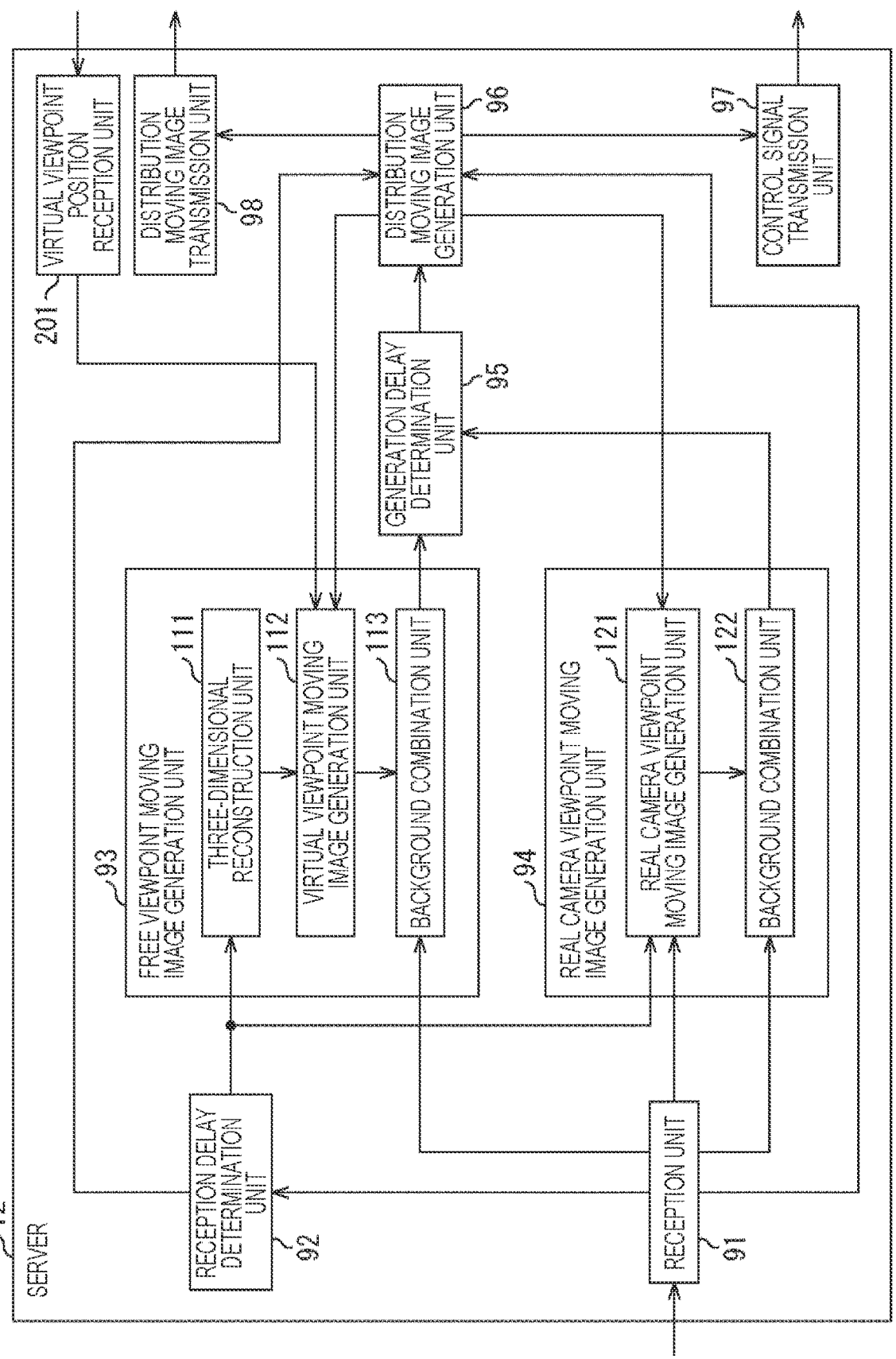
FIG. 19 is a block diagram showing a second functional configuration example of a server.

FIG. 19 is a block diagram showing a second functional configuration example of the server 12.

In FIG. 19, the same components as those of the server 12 in FIG. 11 are denoted by the same reference signs. Redundant description will be omitted as appropriate.

The configuration of the server 12 in FIG. 19 is different from the configuration described with reference to FIG. 11 in that a virtual viewpoint position reception unit 201 is provided before the virtual viewpoint moving image generation unit 112.

The virtual viewpoint position reception unit 201 controls a communication module or the like compatible with wireless communication or wired communication and receives the information indicating the virtual viewpoint position transmitted from the viewing device 14. The information indicating the virtual viewpoint position received by the virtual viewpoint position reception unit 201 is supplied to the virtual viewpoint moving image generation unit 112.

The virtual viewpoint moving image generation unit 112 generates the free viewpoint moving image under the control of the distribution moving image generation unit 96 on the basis of the information indicating the virtual viewpoint position supplied from the virtual viewpoint position reception unit 201.

The distribution moving image generation unit 96 can also control the real camera viewpoint moving image generation unit 121 to generate the real camera viewpoint moving image by using a camera moving image captured by a camera arranged at a position closest to the virtual viewpoint position specified by the viewing device 14.

Note that, in a case where the reception delay determination unit 92 determines that a delay occurs in reception of at least one piece of the encoded data of the multi-view camera moving images or at least one of the multi-view camera moving images is corrupted, the free viewpoint moving image viewed from the virtual viewpoint position specified by the viewing device 14 is not generated.

Therefore, the distribution moving image generation unit 96 may cause the distribution moving image transmission unit 98 to transmit information indicating that the viewpoint of the moving image cannot be changed to the viewing device 14. In such a case, the information indicating that the viewpoint of the moving image cannot be changed is displayed on the display of the viewing device 14.

Figure 20:
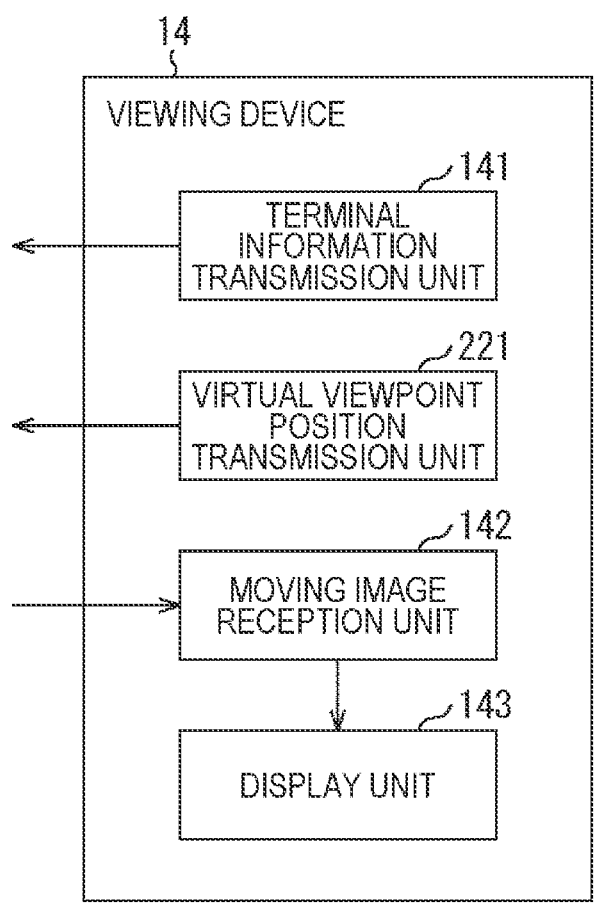
FIG. 20 is a block diagram showing a second functional configuration example of a viewing device.

FIG. 20 is a block diagram showing a second functional configuration example of the viewing device 14.

In FIG. 20, the same components as those of the viewing device 14 in FIG. 12 are denoted by the same reference signs. Redundant description will be omitted as appropriate.

The configuration of the viewing device 14 in FIG. 20 is different from the configuration described with reference to FIG. 12 in that a virtual viewpoint position transmission unit 221 is provided.

The information indicating the virtual viewpoint position is input to the viewing device 14 in response to, for example, a user operation.

The virtual viewpoint position transmission unit 221 transmits the information indicating the virtual viewpoint position to the server 12.

Note that a flow of processing executed by the information processing system 1 is basically similar to the flow of the processing in the sequence diagram of FIG. 13. Processing of transmitting the information indicating the virtual viewpoint position from the viewing device 14 to the server 12 is performed as appropriate.

As described above, the user of the viewing device 14 can specify the viewpoint from which the user sees the subject appearing in the free viewpoint moving image by using the viewing device 14.

In a case where there is a margin in the amount of network bandwidth used for transmitting the camera moving images and the CG background to the server 12, information indicating lighting and shadow to be combined with the free viewpoint moving image may be transmitted to the server 12 together with the encoded data.

Figure 21:
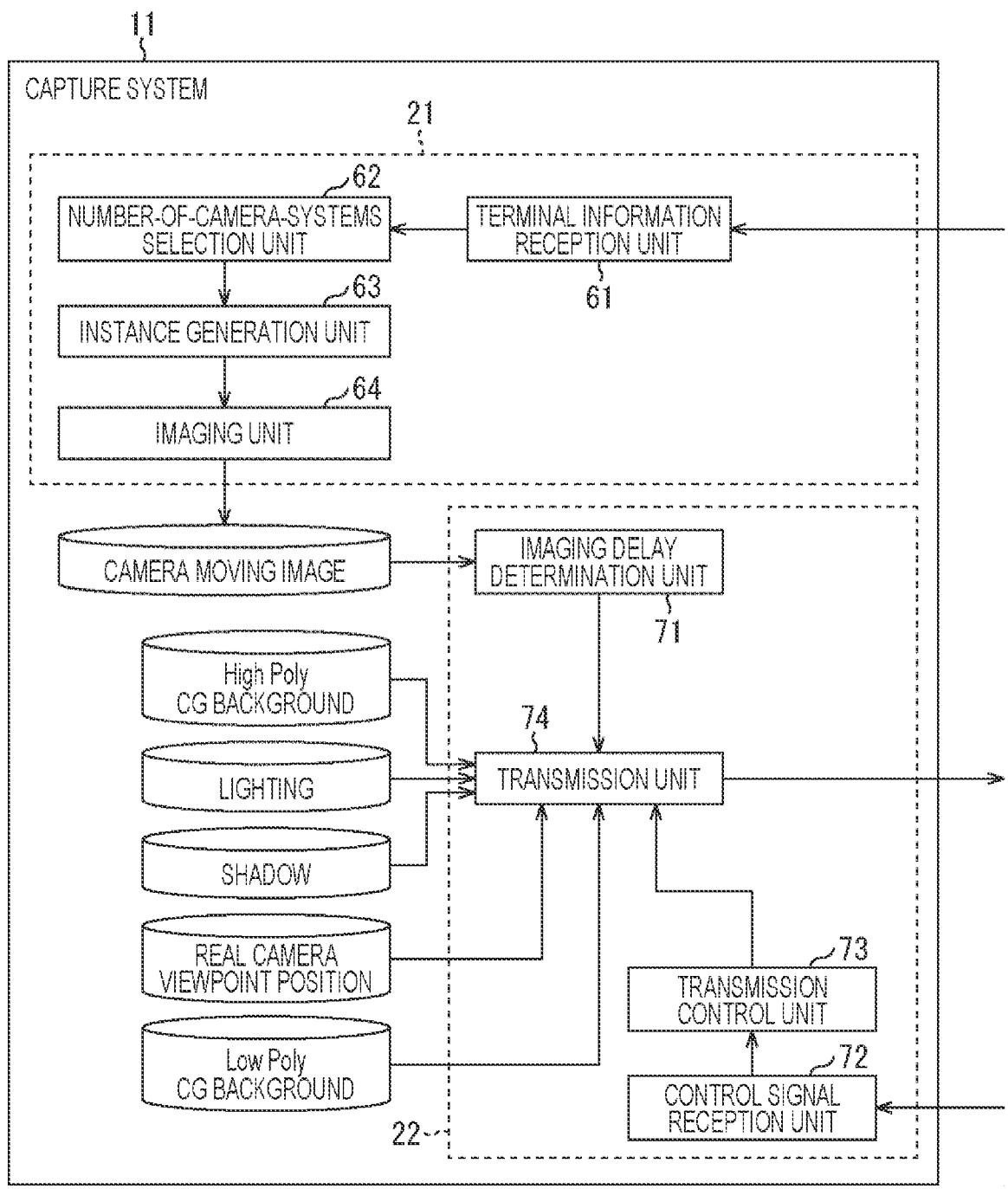
FIG. 21 is a block diagram showing another example of a second functional configuration example of a capture system.

FIG. 21 is a block diagram showing another example of the second functional configuration example of the capture system 11.

In FIG. 21, the same components as those of the capture system 11 in FIG. 18 are denoted by the same reference signs. Redundant description will be omitted as appropriate. The same applies to FIG. 23 described later.

The configuration of the capture system 11 in FIG. 21 is different from the configuration described with reference to FIG. 18 in that the transmission unit 74 acquires a high polygon CG background, information indicating lighting, information indicating shadow, and a low polygon CG background.

The high polygon CG background is a CG background that is finely drawn by using a large number of polygons. The high polygon CG background is used as a background of the free viewpoint moving image. The low polygon CC background is a CG background that is drawn by using a smaller number of polygons, as compared with the high polygon CG background. The low polygon CG background is used as a background of the real camera viewpoint moving image.

The information indicating lighting and shadow is information indicating lighting shed on the 3D model of the subject and shadow of the 3D model generated by the lighting in the free viewpoint moving image.

The transmission unit 74 transmits the encoded data together with the high polygon CG background, the information indicating lighting, the information indicating shadow, the information indicating the real camera viewpoint position, and the low polygon CG background to the server 12 under the control of the transmission control unit 73.

In a case where the transmission unit 74 transmits the encoded data of the multi-view camera moving images, the transmission unit 74 transmits the encoded data together with the high polygon CG background, the information indicating lighting, the information indicating shadow, the information indicating the real camera viewpoint position, and the low polygon CG background to the server 12. Meanwhile, in a case where the transmission unit transmits the encoded data of the one-view camera moving image, the transmission unit transmits the information indicating the real camera viewpoint position and the low polygon CG background to the server 12.

The configuration of the server 12 obtained in a case where the information indicating lighting and shadow to be combined with the free viewpoint moving image is transmitted to the server 12 together with the encoded data is the same as the configuration described with reference to FIG. 19.

The reception unit 91 (FIG. 19) receives the high polygon CG background, the information indicating lighting, the information indicating shadow, the information indicating the real camera viewpoint position, and the low polygon CG background transmitted from the capture system 11. The high polygon CG background, the information indicating lighting, and the information indicating shadow are supplied to the background combination unit 113 of the free viewpoint moving image generation unit 93. The information indicating low polygon is supplied to the background combination unit 122 of the real camera viewpoint moving image generation unit 94.

The background combination unit 113 combines the high polygon CG background, lighting, and shadow supplied from the reception unit 91 with the free viewpoint moving image supplied from the virtual viewpoint moving image generation unit 112. The free viewpoint moving image combined with the CG background and the like is supplied to the generation delay determination unit 95.

The background combination unit 122 combines the low polygon CG background supplied from the reception unit 91 with the real camera viewpoint moving image supplied from the real camera viewpoint moving image generation unit 121. The real camera viewpoint moving image combined with the CG background is supplied to the generation delay determination unit 95.

The free viewpoint moving image combined with the lighting and shadow as described above is displayed on the viewing device 14. This makes it possible to improve the quality of the user experience.

Further, because the high polygon CG background is combined with the free viewpoint moving image, it is possible to provide a finer quality free viewpoint moving image for the user.

4. Third Information Processing Example

Figure 22:
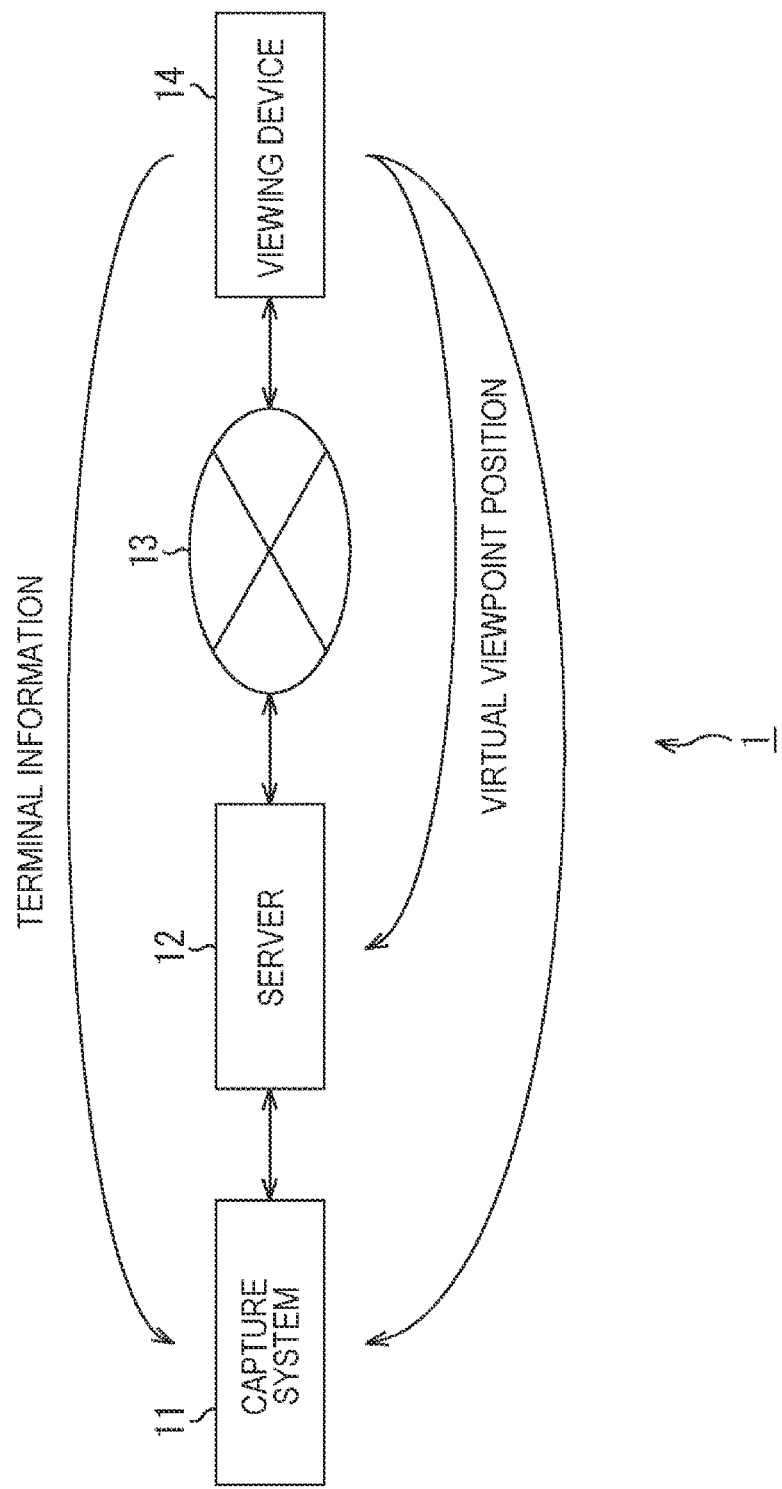
FIG. 22 shows still another example of a flow of information in an information processing system.

FIG. 22 shows still another example of the flow of the information in the information processing system 1.

As shown in FIG. 22, the terminal information may be supplied from the viewing device 14 to the capture system 11, and the information indicating the virtual viewpoint position specified by the viewing device 14 may be supplied to both the capture system 11 and the server 12.

Figure 23:
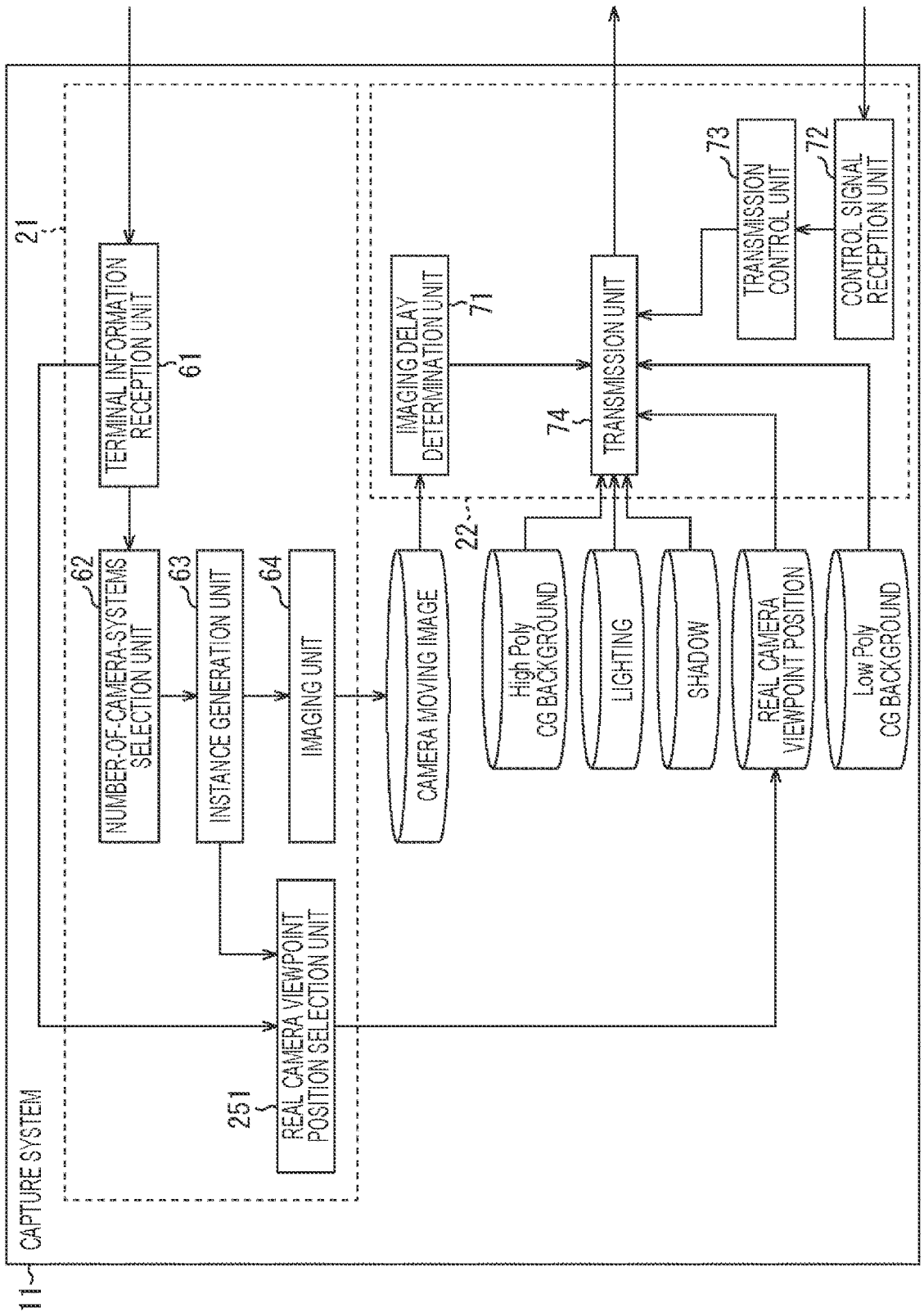
FIG. 23 shows a third functional configuration example of a capture system.

FIG. 23 shows a third functional configuration example of the capture system 11.

The configuration of the capture system 11 in FIG. 23 is different from the configuration described with reference to FIG. 18 in that a real camera viewpoint position selection unit 251 is provided after the terminal information reception unit 61.

The terminal information reception unit 61 receives the information indicating the virtual viewpoint position transmitted from the viewing device 14 and supplies the information to the real camera viewpoint position selection unit 251.

The information indicating the settings is supplied from the instance generation unit 63 to the real camera viewpoint position selection unit 251.

The real camera viewpoint position selection unit 251 selects a camera arranged closest to the virtual viewpoint position specified by the viewing device 14 on the basis of the information supplied from the instance generation unit 63. The real camera viewpoint position selection unit 251 supplies information indicating a position of the selected camera to the transmission unit 74 as information indicating the real camera viewpoint position.

The configuration of the viewing device 14 obtained in a case where the information indicating the virtual viewpoint position specified by the viewing device 14 is supplied to both the capture system 11 and the server 12 is the same as the configuration described with reference to FIG. 20.

The virtual viewpoint position transmission unit 221 (FIG. 20) transmits the information indicating the virtual viewpoint position to both the capture system 11 and the server 12.

Here, processing performed in the whole information processing system 1 having the above configuration will be described.

Figure 24:
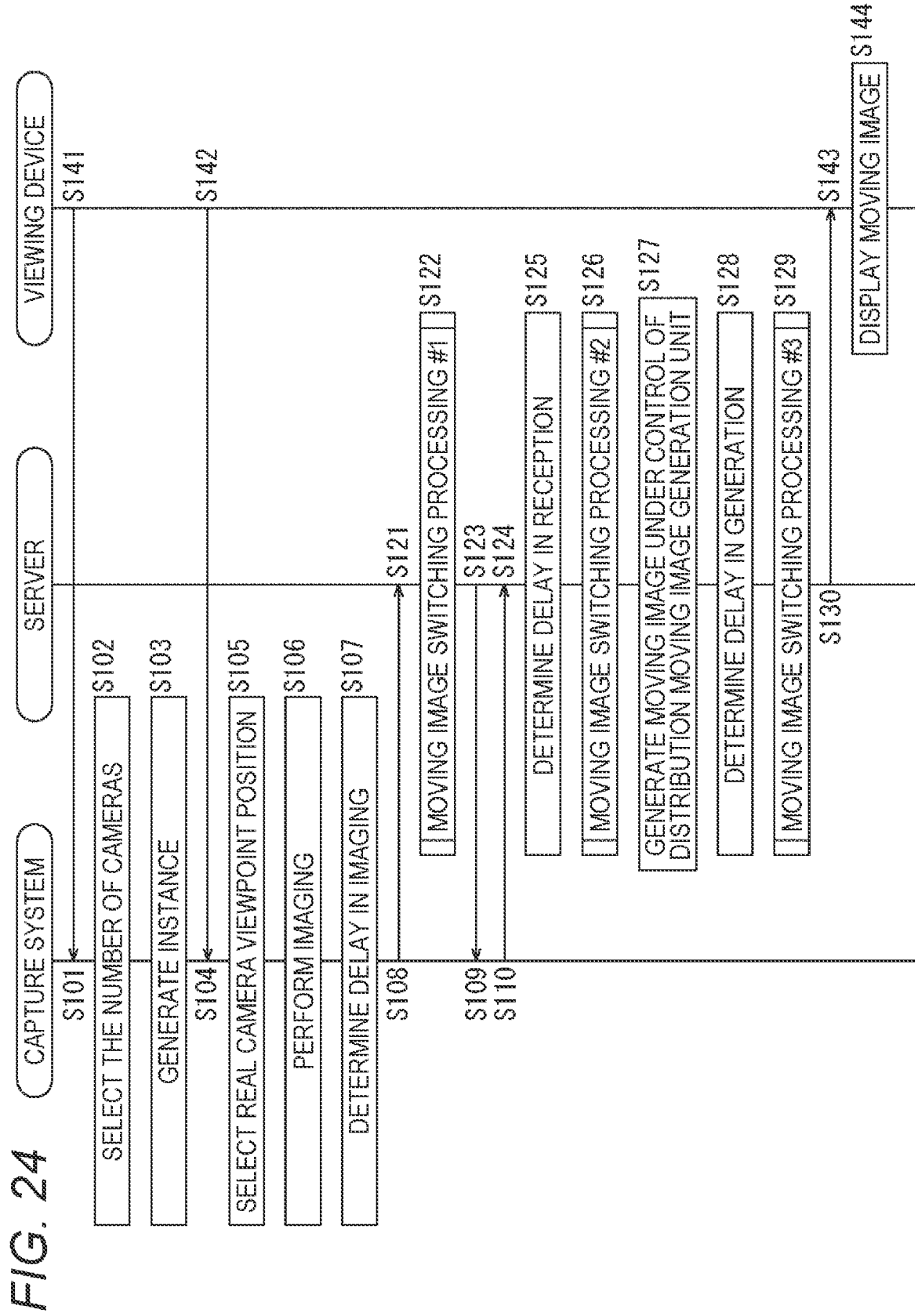
FIG. 24 is a sequence diagram showing another flow of processing performed by a capture system, a server, and a viewing device.

FIG. 24 is a sequence diagram showing another flow of the processing performed by the capture system 11, the server 12, and the viewing device 14.

A process in step S141 in the viewing device 14 is similar to the process in step S41 of FIG. 13. Further, processes in steps S101 to S103 in the capture system 11 are similar to the processes in steps S1 to S3 of FIG. 1.

In step S142, the virtual viewpoint position transmission unit 221 of the viewing device 14 transmits the information indicating the virtual viewpoint position to the capture system 11.

In step S104, the terminal information reception unit 61 of the capture system 11 receives the information indicating the virtual viewpoint position transmitted from the viewing device 14.

In step S105, the real camera viewpoint position selection unit 251 selects the position of the camera arranged closest to the virtual viewpoint position specified by the viewing device 14 as the real camera viewpoint position on the basis of the camera parameters set in step S103.

Processes in steps S106 to S110 in the capture system 11 are similar to the processes in steps S4 to S8 of FIG. 13. Further, processes in steps S121 to S130 in the server 12 are similar to the processes in steps S21 to S30 of FIG. 13. Processes in steps S143 and S144 in the viewing device 14 are similar to the processes in steps S42 and S43 of FIG. 13.

As described above, when the displayed moving image is switched from the free viewpoint moving image to the real camera viewpoint moving image, the real camera viewpoint moving image is generated by using a camera moving image generated by the camera closest to the virtual viewpoint position in the free viewpoint moving image.

This makes it possible to reduce unnaturalness occurring when the displayed moving image is switched from the free viewpoint moving image to the real camera viewpoint moving image.

5. Modification Examples

Computer

The whole or part of the processing of the capture system 11, the server 12, and the viewing device 14 described above can be executed by hardware or software. In a case where the processing of the capture system 11, the server 12, and the viewing device 14 is executed by software, a program constituting the software is installed in a computer incorporated in dedicated hardware, a general-purpose personal computer, or the like from a program recording medium.

Figure 25:
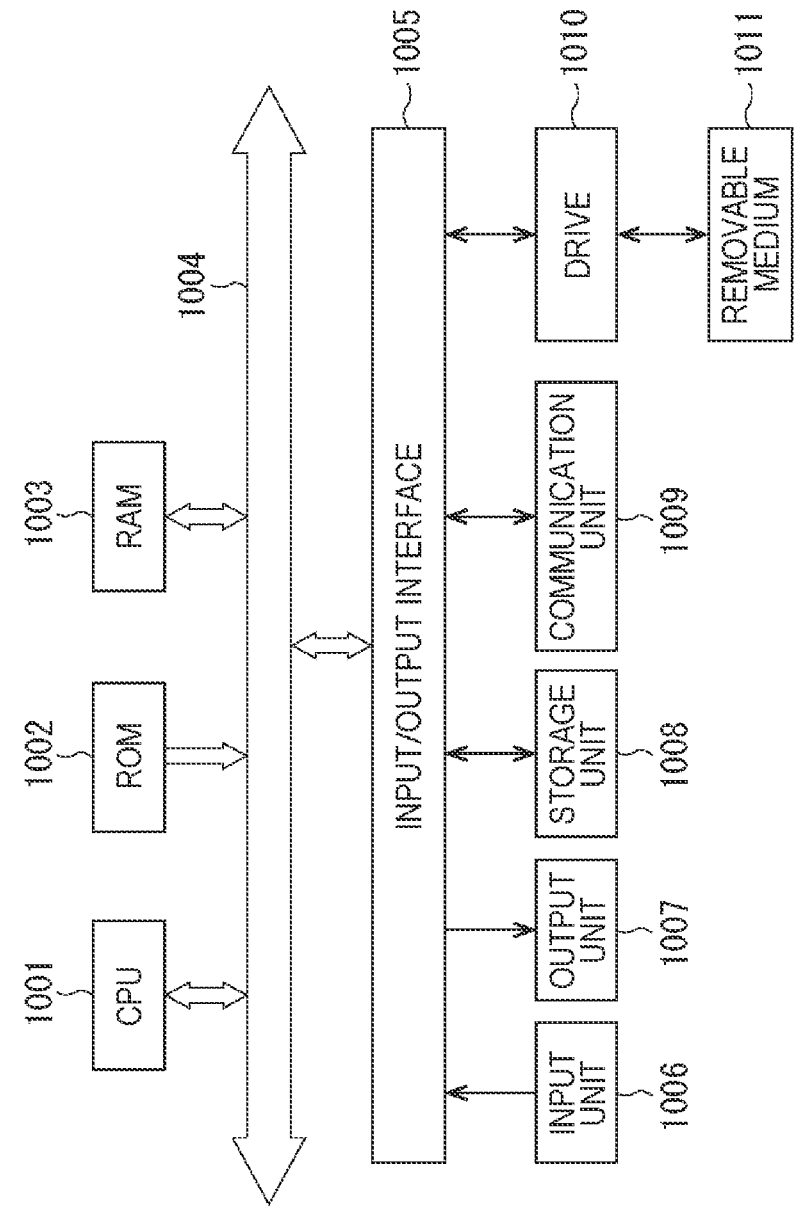
FIG. 25 is a block diagram showing a configuration example of hardware of a computer.

FIG. 25 is a block diagram showing a configuration example of hardware of a computer that executes the processing of the capture system 11, the server 12, and the viewing device 14 described above by using programs.

A central processing unit (CPU) 1001, a read only memory (ROM) 1002, and a random access memory (RAM) 1003 are connected to each other by a bus 1004.

The bus 1004 is further connected to an input/output interface 1005. The input/output interface 1005 is connected to an input unit 1006 including a keyboard, a mouse, and the like and an output unit 1007 including a display, a speaker, and the like. Further, the input/output interface 1005 is also connected to a storage unit 1008 including a hard disk, a nonvolatile memory, and the like, a communication unit 1009 including a network interface and the like, and a drive 1010 that drives a removable medium 1011.

In the computer configured as described above, the series of processing described above is performed by, for example, the CPU 1001 loading a program stored in the storage unit 1008 into the RAM 1003 via the input/output interface 1005 and the bus 1004 and executing the program.

The program executed by the CPU 1001 is provided, for example, by being recorded on the removable medium 1011 or via a wired or wireless transmission medium such as a local area network, the Internet, or digital broadcasting, and is installed in the storage unit 1008.

Note that the program executed by the computer may be a program in which the processing is performed in time series in the order described in the present specification, or may be a program in which the processing is performed in parallel or at a necessary timing such as when a call is made. Others Note that, in this specification, a system means a set of a plurality of components (devices, modules (parts), and the like), and it does not matter whether or not all the components are included in the same housing. Therefore, a plurality of devices included in separate housings and connected via a network and a single device including a plurality of modules in a single housing are both systems.

The effects described in the present specification are merely illustrative and are not limited. Further, additional effects may be obtained.

The embodiments of the present technology are not limited to the above embodiments and can be variously modified without departing from the gist of the present technology.

For example, the present technology can have a configuration of cloud computing in which a single function is shared and jointly processed by a plurality of devices via a network.

Further, each of the steps described in the above flowcharts can be executed by a single device or can be executed by being shared by a plurality of devices.

Furthermore, in a case where a single step includes a plurality of processes, the plurality of processes included in the single step can be executed by a single device or can be executed by being shared by a plurality of devices.

<Combination Examples of Configurations>

The present technology can also have the following configurations.

(1)

An information processing device including:

a transmission unit that transmits a moving image; and a control unit that controls the transmission unit to transmit a free viewpoint moving image or a real camera viewpoint moving image on the basis of a determination result regarding whether or not the free viewpoint moving image has been successfully generated, the free viewpoint moving image being a moving image generated by using a plurality of camera moving images generated by imaging a subject by using a plurality of cameras and viewed from an arbitrary position and direction, the real camera viewpoint moving image being a moving image generated from a camera moving image generated by imaging the subject by using a camera and viewed from a position and direction of the camera.

(2)

The information processing device according to (1), in which
the control unit
causes the transmission unit to transmit the free viewpoint moving image in a case where it is determined that no delay occurs in the generation of the free viewpoint moving image as the determination result, and
causes the transmission unit to transmit the real camera viewpoint moving image in a case where it is determined that a delay occurs in the generation of the free viewpoint moving image as the determination result.

(3)

The information processing device according to (2), further including
a generation determination unit that determines whether or not a delay occurs in the generation of the free viewpoint moving image, in which
the control unit
causes the transmission unit to transmit the free viewpoint moving image in a case where the generation determination unit determines that no delay occurs in the generation of the free viewpoint moving image, and
causes the transmission unit to transmit the real camera viewpoint moving image in a case where the generation determination unit determines that a delay occurs in the generation of the free viewpoint moving image.

(4) The information processing device according to any one of (1) to (3), in which:
the control unit
causes the transmission unit to transmit the free viewpoint moving image in a case where it is determined that encoded data of the plurality of camera moving images has been successfully decoded as the determination result, and
causes the transmission unit to transmit the real camera viewpoint moving image in a case where it is determined that at least one piece of the encoded data of the plurality of camera moving images has not been decoded as the determination result.

(5)

The information processing device according to (4), further including
a decoding determination unit that determines whether or not the encoded data of the plurality of camera moving images has been successfully decoded, in which
the control unit
causes the transmission unit to transmit the free viewpoint moving image in a case where the decoding determination unit determines that the encoded data of the plurality of camera moving images has been successfully decoded, and
causes the transmission unit to transmit the real camera viewpoint moving image in a case where the decoding determination unit determines that at least one piece of the encoded data of the plurality of camera moving images has not been decoded.

(6)

The information processing device according to any one of (1) to (5), in which
the control unit
causes the transmission unit to transmit the free viewpoint moving image in a case where it is determined that no delay occurs in reception of the plurality of camera moving images used for generating the free viewpoint moving image as the determination result, and
causes the transmission unit to transmit the real camera viewpoint moving image in a case where it is determined that a delay occurs in reception of at least one of the plurality of camera moving images used for generating the free viewpoint moving image as the determination result.

(7)

The information processing device according to (6), further including
a reception determination unit that determines whether or not a delay occurs in the reception of the plurality of camera moving images, in which
the control unit
causes the transmission unit to transmit the free viewpoint moving image in a case where the reception determination unit determines that no delay occurs in the reception of the plurality of camera moving images, and
causes the transmission unit to transmit the real camera viewpoint moving image in a case where the reception determination unit determines that a delay occurs in the reception of the at least one of the plurality of camera moving images.

(8)

The information processing device according to any one of (1) to (7), further including
a free viewpoint moving image generation unit that generates the free viewpoint moving image by using the plurality of camera moving images, in which
the control unit controls the transmission unit to transmit the free viewpoint moving image generated by the free viewpoint moving image generation unit or generate the real camera viewpoint moving image on the basis of the determination result.

(9)

The information processing device according to (8), in which
before the control unit causes the transmission unit to transmit the real camera viewpoint moving image, the free viewpoint moving image generation unit generates the free viewpoint moving image in which a viewpoint moves to approach a viewpoint of the real camera viewpoint moving image under control of the control unit.

(10)

The information processing device according to (8) or (9), further including
a decoding unit that decodes encoded data of the plurality of camera moving images to restore the plurality of camera moving images, in which
the free viewpoint moving image generation unit generates the free viewpoint moving image by using the plurality of camera moving images restored by the decoding unit.

(11)

The information processing device according to (10), further including
a reception unit that receives the encoded data transmitted from another device, in which
the decoding unit decodes the encoded data received by the reception unit.

(12)

The information processing device according to any one of (1) to (11), further including
a real camera viewpoint moving image generation unit that generates the real camera viewpoint moving image by using the camera moving image, in which
the control unit controls the transmission unit to transmit the free viewpoint moving image or generate the real camera viewpoint moving image generated by the real camera viewpoint moving image generation unit on the basis of the determination result.

(13)

The information processing device according to (12), in which
the real camera viewpoint moving image generation unit generates the real camera viewpoint moving image by using any one of the plurality of camera moving images used for generating the free viewpoint moving image.

(14)

The information processing device according to (12), in which
the real camera viewpoint moving image generation unit generates the real camera viewpoint moving image by using another camera moving image different from the plurality of camera moving images used for generating the free viewpoint moving image.

(15)

The information processing device according to any one of (12) to (14), in which
the real camera viewpoint moving image generation unit generates the real camera viewpoint moving image under control of the control unit by using the camera moving image whose viewpoint is closer to a viewpoint of the free viewpoint moving image.

(16)

An information processing method including:
by an information processing device,
controlling a transmission unit to transmit a free viewpoint moving image or a real camera viewpoint moving image on the basis of a result of determination on whether or not the free viewpoint moving image has been successfully generated, the free viewpoint moving image being a moving image generated by using a plurality of camera moving images generated by imaging a subject by using a plurality of cameras and viewed from an arbitrary position and direction, the real camera viewpoint moving image being a moving image generated from a camera moving image generated by imaging the subject by using a camera and viewed from a position and direction of the camera; and
transmitting the free viewpoint moving image or the real camera viewpoint moving image in accordance with the control.

(17)

A program for causing a computer to execute the processing of:
controlling a transmission unit to transmit a free viewpoint moving image or a real camera viewpoint moving image on the basis of a result of determination on whether or not the free viewpoint moving image has been successfully generated, the free viewpoint moving image being a moving image generated by using a plurality of camera moving images generated by imaging a subject by using a plurality of cameras and viewed from an arbitrary position and direction, the real camera viewpoint moving image being a moving image generated from a camera moving image generated by imaging the subject by using a camera and viewed from a position and direction of the camera; and
transmitting the free viewpoint moving image or the real camera viewpoint moving image in accordance with the control.

(18)

An information processing system including an imaging device and an information processing device, in which
the imaging device includes
a plurality of imaging units each of which images a subject and generates a camera moving image,
an imaging determination unit that determines whether or not the camera moving images have been successfully generated by the plurality of imaging units, and
an information transmission unit that transmits, to the information processing device, the plurality of camera moving images generated by the plurality of imaging units and a determination result obtained by the imaging determination unit, and
the information processing device includes
an information reception unit that receives the plurality of camera moving images and the determination result transmitted from the imaging device,
a moving image transmission unit that transmits a moving image, and
a control unit that controls the information transmission unit to transmit a free viewpoint moving image or a real camera viewpoint moving image on the basis of the determination result received by the information reception unit, the free viewpoint moving image being a moving image generated by using the plurality of camera moving images received by the information reception unit and viewed from an arbitrary position and direction, the real camera viewpoint moving image being a moving image generated by using the camera moving image received by the information reception unit and viewed from a position and direction of the imaging unit.

(19)

The information processing system according to (18), in which
the imaging determination unit of the imaging device determines whether or not out-of-synchronization and frame drop occur in the plurality of camera moving images.

(20)

The information processing system according to (18) or (19), in which
the information processing device further includes
a control information transmission unit that transmits control information specifying the camera moving image to the imaging device, the control information being generated by the control unit on the basis of the determination result,
the imaging device further includes
a control information reception unit that receives the control information transmitted from the information processing device, and
the information transmission unit of the imaging device transmits the camera moving image specified by the control unit to the information processing device in accordance with the control information received by the control information reception unit.

REFERENCE SIGNS LIST

1 Information processing system
11 Capture system
12 Server
13 Network
14 Viewing device
21 Imaging device
22 Transmission device
31 Camera system
61 Terminal information reception unit
62 Number-of-camera-systems selection unit
63 Instance generation unit
64 Imaging unit
71 Imaging delay determination unit
72 Control signal reception unit
73 Transmission control unit
74 Transmission unit
91 Reception unit
92 Reception delay determination unit
93 Free viewpoint moving image generation unit
94 Real camera viewpoint moving image generation unit
95 Generation delay determination unit
96 Distribution moving image generation unit
97 Control signal transmission unit
98 Distribution moving image transmission unit
111 Three-dimensional reconstruction unit
112 Virtual viewpoint moving image generation unit
113 Background combination unit
121 Real camera viewpoint moving image generation unit
122 Background combination unit
141 Terminal information transmission unit
142 Moving image reception unit
143 Display unit
201 Virtual viewpoint position reception unit
221 Virtual viewpoint position transmission unit
251 Real camera viewpoint position selection unit

The invention claimed is:

1. An information processing device comprising:
a transmission unit that transmits a moving image; and
a control unit that controls the transmission unit to transmit a free viewpoint moving image or a real camera viewpoint moving image on a basis of a result of determination on whether or not the free viewpoint moving image has been successfully generated, the free viewpoint moving image being a moving image generated by using a plurality of camera moving images generated by imaging a subject by using a plurality of cameras and viewed from an arbitrary position and direction, the real camera viewpoint moving image being a moving image generated from a camera moving image generated by imaging the subject by using a camera and viewed from a position and direction of the camera,
wherein the transmission unit and the control unit are each implemented via at least one processor.

2. The information processing device according to claim 1, wherein
the control unit
causes the transmission unit to transmit the free viewpoint moving image in a case where it is determined that no delay occurs in the generation of the free viewpoint moving image as the determination result, and
causes the transmission unit to transmit the real camera viewpoint moving image in a case where it is determined that a delay occurs in the generation of the free viewpoint moving image as the determination result.

3. The information processing device according to claim 2, further comprising
a generation determination unit that determines whether or not a delay occurs in the generation of the free viewpoint moving image, wherein
the control unit
causes the transmission unit to transmit the free viewpoint moving image in a case where the generation determination unit determines that no delay occurs in the generation of the free viewpoint moving image, and
causes the transmission unit to transmit the real camera viewpoint moving image in a case where the generation determination unit determines that a delay occurs in the generation of the free viewpoint moving image, and
the generation determination unit is implemented via at least one processor.

4. The information processing device according to claim 1, wherein
the control unit
causes the transmission unit to transmit the free viewpoint moving image in a case where it is determined that encoded data of the plurality of camera moving images has been successfully decoded as the determination result, and
causes the transmission unit to transmit the real camera viewpoint moving image in a case where it is determined that at least one piece of the encoded data of the plurality of camera moving images has not been decoded as the determination result.

5. The information processing device according to claim 4, further comprising
a decoding determination unit that determines whether or not the encoded data of the plurality of camera moving images has been successfully decoded, wherein
the control unit
causes the transmission unit to transmit the free viewpoint moving image in a case where the decoding determination unit determines that the encoded data of the plurality of camera moving images has been successfully decoded, and
causes the transmission unit to transmit the real camera viewpoint moving image in a case where the decoding determination unit determines that at least one piece of the encoded data of the plurality of camera moving images has not been decoded, and
the decoding determination unit is implemented via at least one processor.

6. The information processing device according to claim 1, wherein
the control unit
causes the transmission unit to transmit the free viewpoint moving image in a case where it is determined that no delay occurs in reception of the plurality of camera moving images used for generating the free viewpoint moving image as the determination result, and
causes the transmission unit to transmit the real camera viewpoint moving image in a case where it is determined that a delay occurs in reception of at least one of the plurality of camera moving images used for generating the free viewpoint moving image as the determination result.

7. The information processing device according to claim 6, further comprising
a reception determination unit that determines whether or not a delay occurs in the reception of the plurality of camera moving images, wherein
the control unit
causes the transmission unit to transmit the free viewpoint moving image in a case where the reception determination unit determines that no delay occurs in the reception of the plurality of camera moving images, and
causes the transmission unit to transmit the real camera viewpoint moving image in a case where the reception determination unit determines that a delay occurs in the reception of the at least one of the plurality of camera moving images, and
the reception determination unit is implemented via at least one processor.

8. The information processing device according to claim 1, further comprising
a free viewpoint moving image generation unit that generates the free viewpoint moving image by using the plurality of camera moving images, wherein
the control unit controls the transmission unit to transmit the free viewpoint moving image generated by the free viewpoint moving image generation unit or generate the real camera viewpoint moving image on a basis of the determination result, and
the free viewpoint moving image generation unit is implemented via at least one processor.

9. The information processing device according to claim 8, wherein
before the control unit causes the transmission unit to transmit the real camera viewpoint moving image, the free viewpoint moving image generation unit generates the free viewpoint moving image in which a viewpoint moves to approach a viewpoint of the real camera viewpoint moving image under control of the control unit.

10. The information processing device according to claim 8, further comprising
a decoding unit that decodes encoded data of the plurality of camera moving images to restore the plurality of camera moving images, wherein
the free viewpoint moving image generation unit generates the free viewpoint moving image by using the plurality of camera moving images restored by the decoding unit, and
the decoding unit is implemented via at least one processor.

11. The information processing device according to claim 10, further comprising
a reception unit that receives the encoded data transmitted from another device, wherein
the decoding unit decodes the encoded data received by the reception unit, and
the reception unit is implemented via at least one processor.

12. The information processing device according to claim 1, further comprising
a real camera viewpoint moving image generation unit that generates the real camera viewpoint moving image by using the camera moving image, wherein
the control unit controls the transmission unit to transmit the free viewpoint moving image or generate the real camera viewpoint moving image generated by the real camera viewpoint moving image generation unit on a basis of the determination result, and
the real camera viewpoint moving image generation unit is implemented via at least one processor.

13. The information processing device according to claim 12, wherein
the real camera viewpoint moving image generation unit generates the real camera viewpoint moving image by using any one of the plurality of camera moving images used for generating the free viewpoint moving image.

14. The information processing device according to claim 12, wherein
the real camera viewpoint moving image generation unit generates the real camera viewpoint moving image by using another camera moving image different from the plurality of camera moving images used for generating the free viewpoint moving image.

15. The information processing device according to claim 12, wherein
the real camera viewpoint moving image generation unit generates the real camera viewpoint moving image under control of the control unit by using the camera moving image whose viewpoint is closer to a viewpoint of the free viewpoint moving image.

16. An information processing method comprising:
by an information processing device,
controlling a transmission of a free viewpoint moving image or a real camera viewpoint moving image on a basis of a result of determination on whether or not the free viewpoint moving image has been successfully generated, the free viewpoint moving image being a moving image generated by using a plurality of camera moving images generated by imaging a subject by using a plurality of cameras and viewed from an arbitrary position and direction, the real camera viewpoint moving image being a moving image generated from a camera moving image generated by imaging the subject by using a camera and viewed from a position and direction of the camera; and
transmitting the free viewpoint moving image or the real camera viewpoint moving image in accordance with the control.

17. A non-transitory computer-readable medium having embodied thereon a program, which when executed by a computer causes the computer to execute a method, the method comprising:
controlling a transmission of a free viewpoint moving image or a real camera viewpoint moving image on a basis of a result of determination on whether or not the free viewpoint moving image has been successfully generated, the free viewpoint moving image being a moving image generated by using a plurality of camera moving images generated by imaging a subject by using a plurality of cameras and viewed from an arbitrary position and direction, the real camera viewpoint moving image being a moving image generated from a camera moving image generated by imaging the subject by using a camera and viewed from a position and direction of the camera; and
transmitting the free viewpoint moving image or the real camera viewpoint moving image in accordance with the control.

18. An information processing system comprising an imaging device and an information processing device, wherein
the imaging device includes
a plurality of imaging units each of which images a subject and generates a camera moving image,
an imaging determination unit that determines whether or not the camera moving images have been successfully generated by the plurality of imaging units, and
an information transmission unit that transmits, to the information processing device, the plurality of camera moving images generated by the plurality of imaging units and a determination result obtained by the imaging determination unit,
the imaging determination unit and the information transmission unit are each implemented via at least one processor,
the information processing device includes
an information reception unit that receives the plurality of camera moving images and the determination result transmitted from the imaging device,
a moving image transmission unit that transmits a moving image, and
a control unit that controls the information transmission unit to transmit a free viewpoint moving image or a real camera viewpoint moving image on a basis of the determination result received by the information reception unit, the free viewpoint moving image being a moving image generated by using the plurality of camera moving images received by the information reception unit and viewed from an arbitrary position and direction, the real camera viewpoint moving image being a moving image generated by using the camera moving image received by the information reception unit and viewed from a position and direction of the imaging unit, and
the information reception unit, the moving image transmission unit, and the control unit are each implemented via at least one processor.

19. The information processing system according to claim 18, wherein
the imaging determination unit of the imaging device determines whether or not out-of-synchronization and frame drop occur in the plurality of camera moving images.

20. The information processing system according to claim 18, wherein
the information processing device further includes
a control information transmission unit that transmits control information specifying the camera moving image to the imaging device, the control information being generated by the control unit on a basis of the determination result,
the imaging device further includes
a control information reception unit that receives the control information transmitted from the information processing device,
the information transmission unit of the imaging device transmits the camera moving image specified by the control unit to the information processing device in accordance with the control information received by the control information reception unit, and
the control information transmission unit and the control information reception unit are each implemented via at least one processor.

* * * * *